(12) United States Patent
Winter

(10) Patent No.: US 8,116,610 B2
(45) Date of Patent: Feb. 14, 2012

(54) METHOD AND APPARATUS FOR DISPLAYING VIDEO SIGNAL DATA WITH PROTECTION AGAINST DIGITAL COPYING

(75) Inventor: Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 445 days.

(21) Appl. No.: 12/312,443

(22) PCT Filed: Nov. 7, 2007

(86) PCT No.: PCT/EP2007/062013
§ 371 (c)(1),
(2), (4) Date: May 11, 2009

(87) PCT Pub. No.: WO2008/061889
PCT Pub. Date: May 29, 2008

(65) Prior Publication Data
US 2010/0054699 A1   Mar. 4, 2010

(30) Foreign Application Priority Data

Nov. 23, 2006   (EP) ..................................... 06124652

(51) Int. Cl.
*H04N 9/80*   (2006.01)
(52) U.S. Cl. ......... 386/252; 386/253; 386/255; 386/257
(58) Field of Classification Search ................... 386/252, 386/253, 255, 257
See application file for complete search history.

(56) References Cited

U.S. PATENT DOCUMENTS

| 7,266,753 | B2 * | 9/2007  | Tomita ........................... 714/776 |
| 7,434,937 | B2 * | 10/2008 | Chung ............................. 353/70 |
| 7,484,163 | B2 * | 1/2009  | Tomita ........................... 714/775 |
| 7,484,164 | B2 * | 1/2009  | Tomita ........................... 714/775 |

FOREIGN PATENT DOCUMENTS

| EP | 519320      | 12/1992 |
| WO | WO 01/56279 | 8/2001  |

OTHER PUBLICATIONS

Search Report Dated Jan. 17, 2008.

* cited by examiner

*Primary Examiner* — Jamie Atala
(74) *Attorney, Agent, or Firm* — Robert D. Shedd; Jeffrey M. Navon

(57) ABSTRACT

New movies from content providers are often made available on the Internet before being launched in the cinemas. Pre-released movies like DVD Videos for journalists are the main reason for this situation because some journalists seem to make these movies available to the Internet users. However, this causes significant harm to the content providers. According to the invention, the pre-releases are still DVD Videos or other conventional video formats but the playback of such encoded video signal is not possible using only a conventional DVD player or DVD player software because the playback requires additional hardware. An additional box (CP splitter box) splits the original video signal into two different video signals to be projected using two different beamers (A, B) which both are required for generating the whole video content. The beamers have different locations each with a different angle to the silver screen, and each beamer generates only a part of the video.

43 Claims, 32 Drawing Sheets

METHOD AND APPARATUS FOR DISPLAYING VIDEO SIGNAL DATA WITH PROTECTION AGAINST DIGITAL COPYING

This application claims the benefit, under 35 U.S.C. §365 of International Application PCT/EP2007/062013, filed Nov. 7, 2007, which was published in accordance with PCT Article 21(2) on May 29, 2008 in English and which claims the benefit of European patent application No. 06124652.6, filed Nov. 23, 2006.

The invention relates to displaying video signal data in a manner protected against digital copying, and to providing or processing encoded video signal data that are protected against digital copying.

BACKGROUND

New movies from content providers are often made available on the Internet before being launched in the cinemas. Pre-released movies like DVD Videos for journalists are the main reason for this situation because some journalists seem to make these movies available to the Internet users. However, this causes significant harm to the content providers.

CSS (Content scrambling system) is the copy protection system for DVD Video, but unfortunately it has already been hacked by user-friendly (i.e. simple-to-use) PC software, e.g. DVD Decryptor and DVD Shrink.

It is also known to watermark DVD Video discs or pre-released movies.

INVENTION

However, if somebody can track the origin of the movie or video, it is already in the world. Therefore it is desirable to avoid the copying itself, and a watermarking of the video content can be performed in addition.

A problem to be solved by the invention is to provide movie pre-releases or other video material, which are copy protected with respect to Internet distribution or which are unusable in the Internet. This problem is solved by the methods disclosed in claims 1 to 3. An apparatus that utilises the method of claim 3 is disclosed in claim 4.

According to the invention, the pre-releases are still DVD Videos or other conventional video formats but the playback of such encoded video signal is not possible using only a conventional DVD player or DVD player software because the playback requires additional hardware. An additional box splits the original video signal into two different video signals A and B. Signal A is to be projected or presented by a first beamer A and signal B is to be projected or presented by a second beamer B, i.e. both beamers are required for generating the whole video content. The beamers have different locations each with a different angle to the silver screen. Each beamer generates only a part of the video, e.g. beamer A the background of the scene and beamer B the people in the foreground, or beamer A the left (or right or upper or lower) part of the video picture and beamer B the remaining part of the video picture. The presented parts of a beamer may change from frame to frame.

Advantageously, due to the different locations of the beamers, a presentation of the video via a single beamer and display would lead to completely distorted video signals. Internet users would not be interested in such distorted videos.

A digital copy of a conventional playback medium is of no interest without the use of a CP (copy protection) splitter box. A user is not able to copy the CP splitter box. Therefore a high-quality copy of the video content is nearly impossible.

Even an analog re-encoding of the video signal output of the CP splitter box does not help, because the video signal is split and each split video signal is intended for different perspectives or projection angles.

Thus, an analog merging followed by re-encoding (e.g. MPEG4-2 Video or MPEG4-10 AVC Video) would not work. The only copying method which would work, is a silver screen recording with a camcorder, but the resulting quality would be rather bad.

A normal user will not have two beamers. Very likely only a small number of people will have two beamers, and because beamers are becoming cheaper it is getting more and more acceptable that journalists will have or buy a second beamer.

In principle, the inventive method is suited for generating and displaying video signal data in a manner protected against digital copying, said method including the steps:

providing partitioned video signal data derived from original video signal data;

encoding said partitioned video signal data and providing for said encoded video signal data presentation control information data that are related to said partition;

receiving and correspondingly decoding said encoded video signal data;

splitting the decoded video signal data into data for at least two different video signals according to said partitioning, thereby using said presentation control information data and a distortion of at least one of said partitions according to distortion information data;

supplying each one of said different video signals to a corresponding number of directional light sources for picture signals, each of which light sources has a different position and/or angle with respect to a common screen on which all light sources project their video signals in order to form a merged video signal approximating said original video signal, wherein said positions and/or angles of said light sources are adapted to said distortion information data, or for providing encoded video signal data that are protected against digital copying, said method including the steps:

providing partitioned video signal data derived from original video signal data;

encoding said partitioned video signal data and providing for said encoded video signal data presentation control information data that are related to said partition, wherein said presentation control information data serve for, upon receiving and correspondingly decoding said encoded video signal data, a split of the decoded video signal data into data for at least two different video signals according to said partitioning using said presentation control information data and a distortion of at least one of said partitions according to distortion information data, and serve for, upon supplying each one of said different video signals to a corresponding number of directional light sources for picture signals, each of which light sources having a different position and/or angle with respect to a common screen, projection of the video signals of all light sources on said screen in order to form a merged video signal approximating said original video signal, wherein said positions and/or angles of said light sources are adapted to said distortion information data, or for processing encoded video signal data that are protected against digital copying, wherein at encoder side partitioned video signal data were provided that were derived from original video signal data and said partitioned video signal data were encoded and for said encoded video signal data presentation control information data related to said partition were provided, said method including the steps:

receiving and correspondingly decoding said encoded video signal data;

splitting the decoded video signal data into data for at least two different video signals according to said partitioning, thereby using said presentation control information data and a distortion of at least one of said partitions according to distortion information data;

supplying each one of said different video signals to a corresponding number of directional light sources for picture signals, each of which light sources has a different position and/or angle with respect to a common screen on which all light sources project their video signals in order to form a merged video signal approximating said original video signal, wherein said positions and/or angles of said light sources are adapted to said distortion information data.

In principle the inventive apparatus is suited for processing encoded video signal data that are protected against digital copying, wherein at encoder side partitioned video signal data were provided that were derived from original video signal data and said partitioned video signal data were encoded and for said encoded video signal data presentation control information data related to said partition were provided, said apparatus including:

means being adapted for splitting received and correspondingly decoded video signal data into data for at least two different video signals according to said partitioning, thereby using said presentation control information data and a distortion of at least one of said partitions according to distortion information data, and for supplying each one of said different video signals to a corresponding number of directional light sources for picture signals, each of which light sources has a different position and/or angle with respect to a common screen on which all light sources project their video signals in order to form a merged video signal approximating said original video signal, wherein said positions and/or angles of said light sources are adapted to said distortion information data.

Advantageous additional embodiments of the invention are disclosed in the respective dependent claims.

DRAWINGS

Exemplary embodiments of the invention are described with reference to the accompanying drawings, which show in:

FIG. 1 prior art beamer, player and silver screen;

FIG. 2 inventive arrangement with two beamers;

FIG. 3 projections resulting from the arrangement of FIG. 2 on the silver screen;

FIG. 4 picture content objects in the projections resulting from the arrangement of FIG. 2;

FIG. 5 shows the resulting projections in case beamers A and B are getting the same input signal;

FIG. 6 inventive construction and encoding of the storage medium pictures to be decoded and re-constructed for projection;

FIG. 7 processing carried out in the splitter box during projection, based on the processing according to FIG. 6;

FIG. 8 second embodiment for the FIG. 6 processing;

FIG. 9 process being carried out in the CP splitter box in the embodiment of FIG. 8;

FIG. 10 possible structure of processing units or functions in the CP splitter box;

FIG. 11 second embodiment for the CP splitter box of FIG. 10;

FIG. 12 depicts how beamer B can be moved to provide the desired perspective;

FIG. 13 structure required for the CP splitter box to perform the correct descrambling;

FIG. 14 two overlapping first embodiment test pictures to be used for adjusting beamer B manually;

FIG. 15 two overlapping second embodiment test pictures to be used for user adjustment of beamer B by pressing corresponding adjustment buttons, step 1 of 4;

FIG. 16 step 2 of 4: the upper right circle is adjusted;

FIG. 17 step 3 of 4: the lower right circle is adjusted;

FIG. 18 step 4 of 4: the remaining circle is adjusted;

FIG. 19 final projection following step 4;

FIG. 20 two overlapping third embodiment test pictures to be used for user adjustment of beamer B by pressing corresponding adjustment buttons, step 1 of 4;

FIG. 21 step 2 of 4: a vertical line is adjusted;

FIG. 22 step 3 of 4: a horizontal line is adjusted;

FIG. 23 step 4 of 4: adjustment of the scaling of the projection;

FIG. 24 final projection following step 4;

FIG. 25 simplified solution for a simple beamer;

FIG. 26 presentation control information data detector and distortion information data;

FIG. 27 pixel blocks or macroblocks in I, B, and P pictures;

FIG. 28 exchange of blocks within B pictures;

FIG. 29 exchange of blocks within and between B pictures;

FIG. 30 exchange of blocks within B pictures and within I and P pictures;

FIG. 31 exchange of blocks between different picture types;

FIG. 32 exchange of blocks within B pictures, which blocks together with their corresponding reference blocks in the other pictures can be flipped or rotated.

EXEMPLARY EMBODIMENTS

This invention can be used for the conventional DVD Video format and other formats like Video CD, HD-DVD and Blu-ray. Regarding the terms 'video frame' and 'video field': video compression methods like MPEG-1, MPEG-2, MPEG-4 Part 2, MPEG-4 Part 10 and VC-1 and other codecs, e.g. Divx, can code whole video frames or separated video fields as well. However, the related coding method is very similar. So, if in the description or figures video frames are mentioned, then video fields can be used as well, whereby the term 'picture' means 'frame' or 'field'.

In several figures a teletext decoder is mentioned. It is possible to use for this purpose Closed Caption instead. The decoder may become slightly adapted to work with some different video formats (like DVD Video). This may become necessary if appropriate playback devices are not able to produce adequate signals, which may be recognised by teletext decoders. If a playback device is not able to produce appropriate signals (in case e.g. the application format does not allow this), then a similar signal encoding is used.

FIG. 1 shows a prior art disc player which outputs a prior art video signal to a prior art beamer, which beamer projects the corresponding video picture (in a centred manner) on a prior art silver screen.

FIG. 2 shows an inventive arrangement including a prior art disc player which outputs a prior art video signal to a prior art beamer A, which beamer projects a first video picture (in a centred manner) on a prior art silver screen, and further including an additional beamer B projecting a second video picture with a different projection angle on the silver screen, and an inventive CP splitter box that feeds part of the received video signal to beamer A and another part to beamer B. The Ctrl-In and Ctrl-Out connection is used to send Presentation Control Information (PCI) from the video signal source, i.e. the disc player, to the CP splitter box. The PCI is required by the CP splitter box for splitting the video signal appropriately. As an alternative, the PCI signal may be transmitted in the Video-Out signal of the disc player, e.g. in a format coded as a teletext or closed caption signal, whereby the Ctrl-In and Ctrl-Out connection can be omitted.

Another channel for the PCI could be the digital audio signal, e.g. in SPDIF format, accompanying the video signal. In such case the transmitted audio packs contain the PCI information, i.e. the audio packs carry the conventional audio signal and in addition the PCI information for controlling the splitting process in the CP splitter box. The CP splitter box may extract the PCI information from these data packs and pass the remaining actual audio signals to an external audio decoder.

There are many possible ways to transmit the presentation control information data PCI from the disc to the CP splitter box. In the following, only the teletext or closed capture method is used. However, in all embodiments where teletext is mentioned, the received PCI information may also be received via other inputs like SPDIF. The main requirement for this PCI channel is that conventional playback devices shall provide this channel, e.g. DVD Video players usually provide SPDIF format as audio output.

Figure 1:
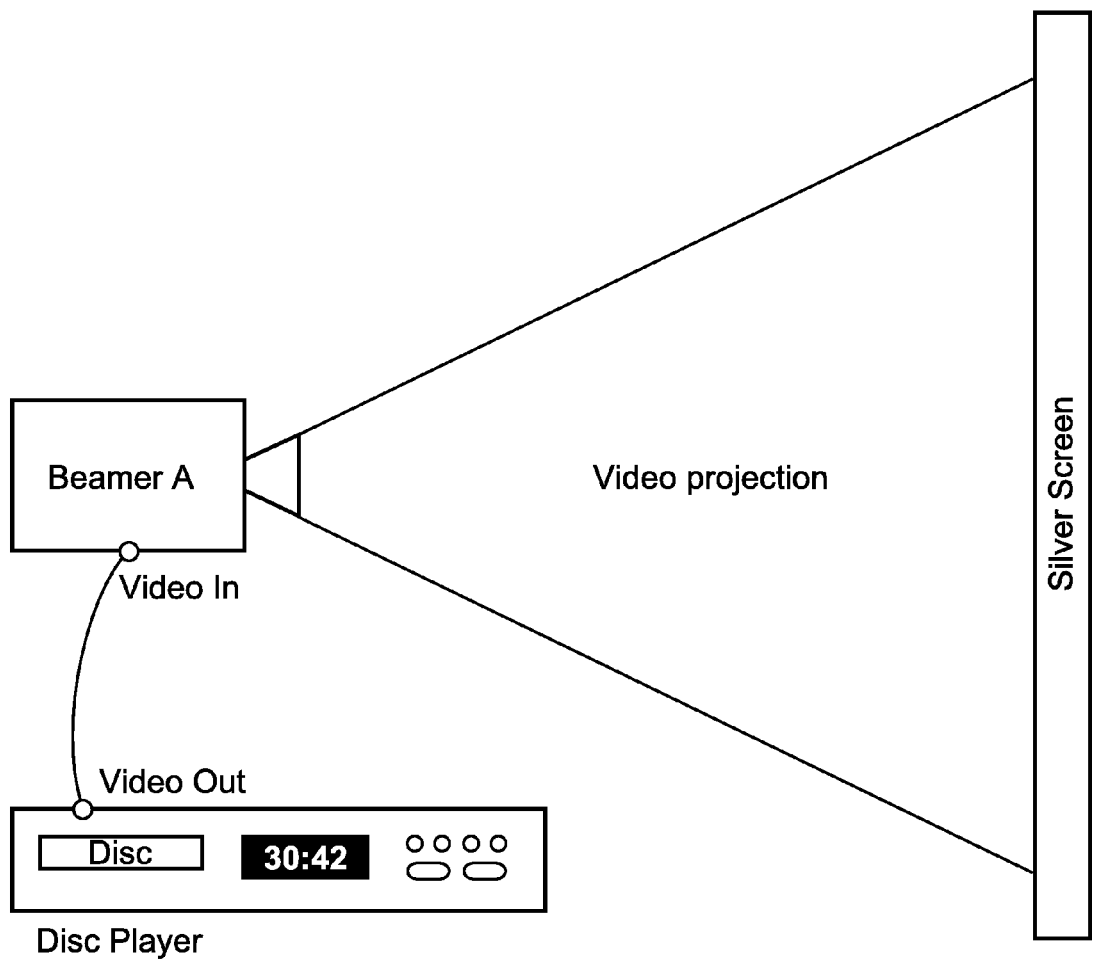
Figure 2:
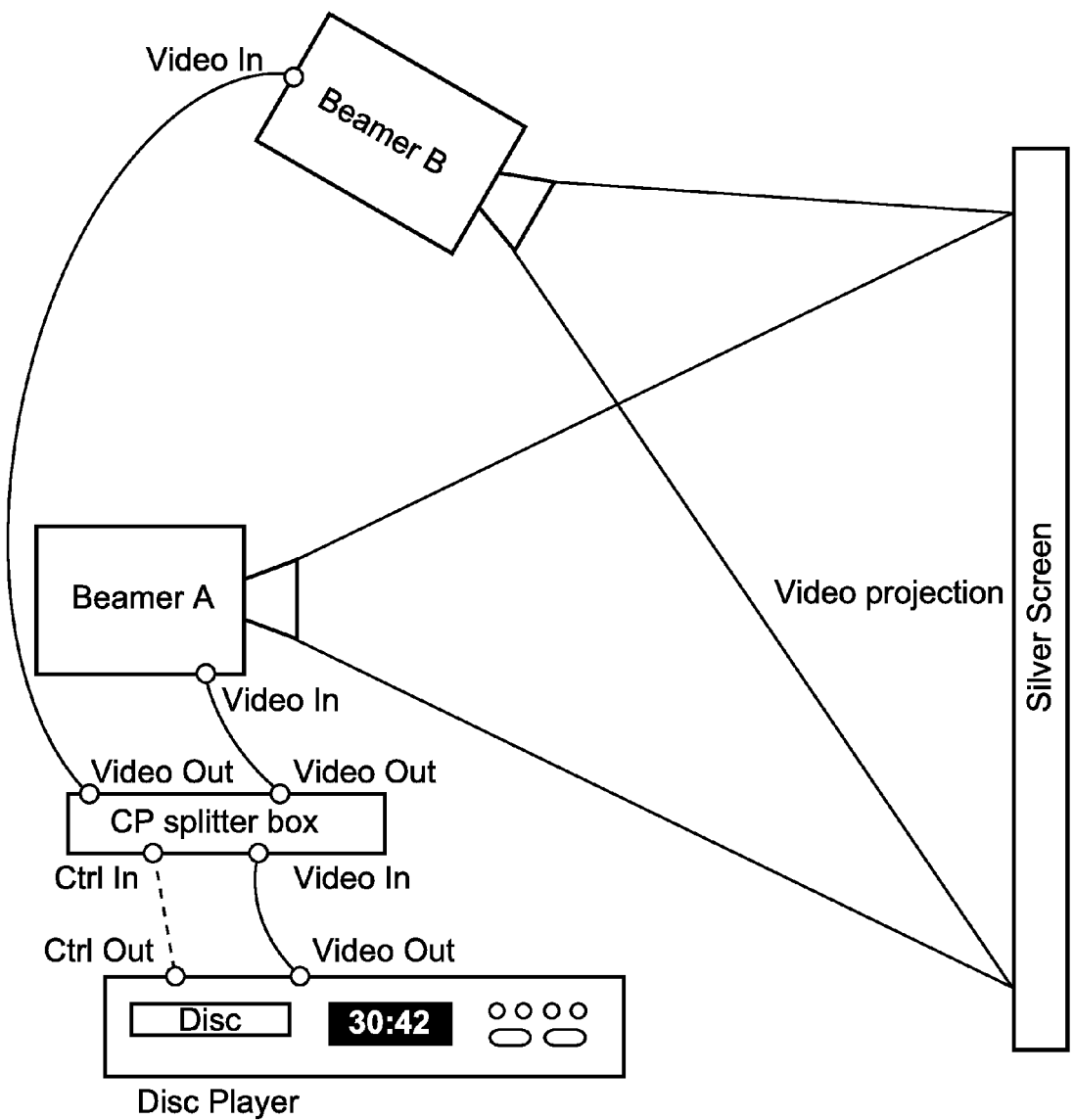
Figure 3:
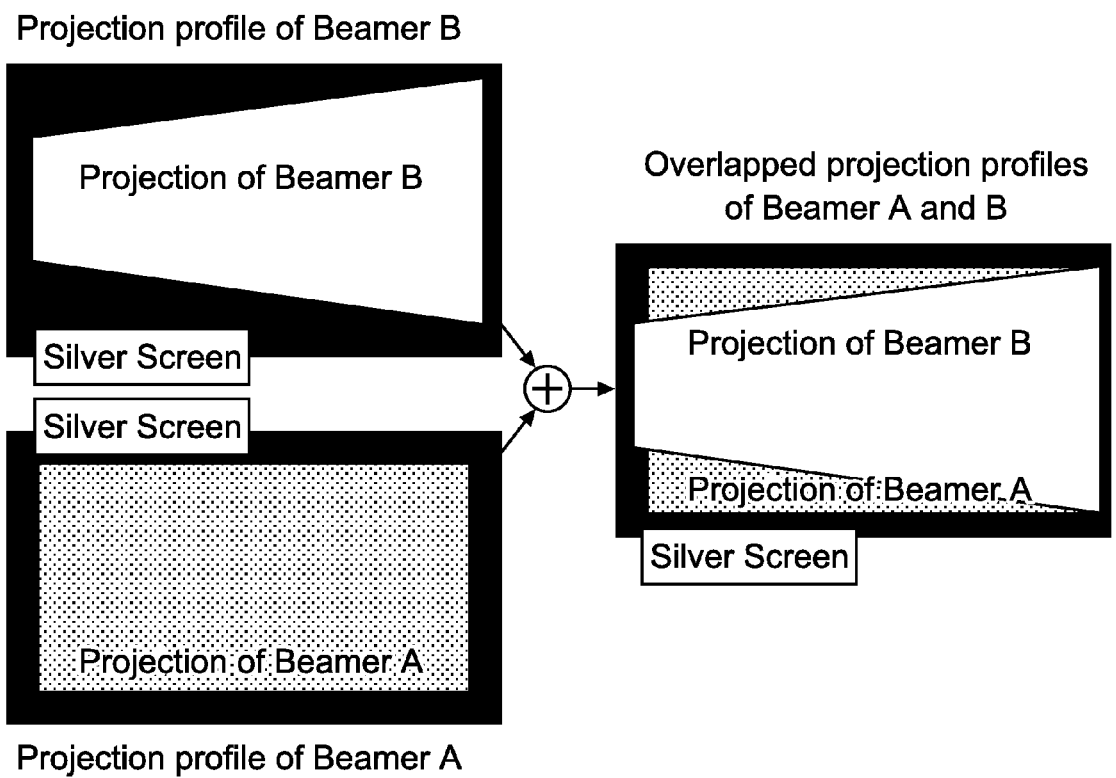
FIG. 3 shows the covered areas on the silver screen of the projections resulting from beamers A and B in FIG. 2. On the left side the projection profiles of beamers A and B are depicted and on the right side the resulting overlapping.
Figure 4:
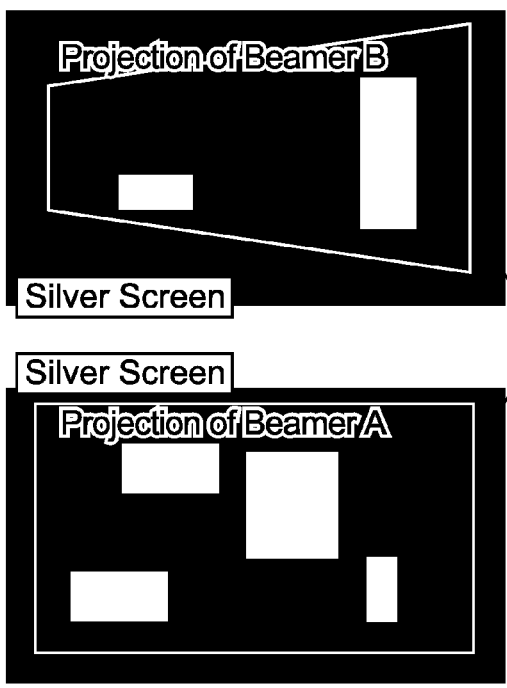
FIG. 4 shows, in addition to FIG. 3, some different graphic objects projected by beamers A and B and the overlapped projection result.
Figure 4:
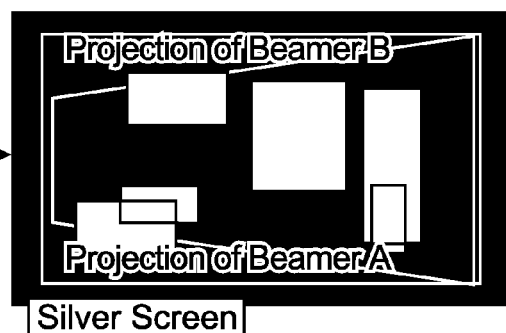
Figure 5:
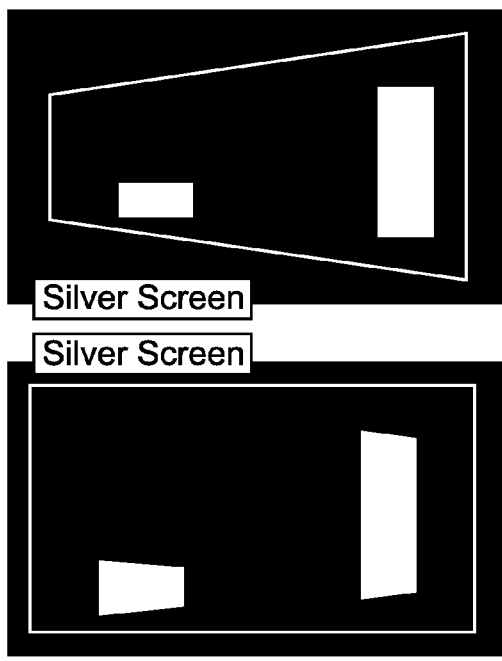
FIG. 5 shows projections resulting from an embodiment similar to that of FIG. 2, but the video output signal from the CP splitter box for beamer B is also used as input signal for beamer A. This emphasises that the video signal for beamer B is a distorted signal in comparison to the conventional beamer A video signal.
Figure 5:
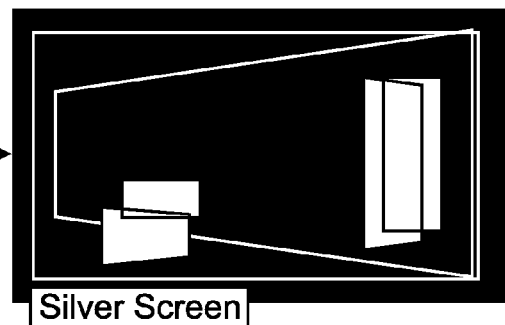
Figure 6:
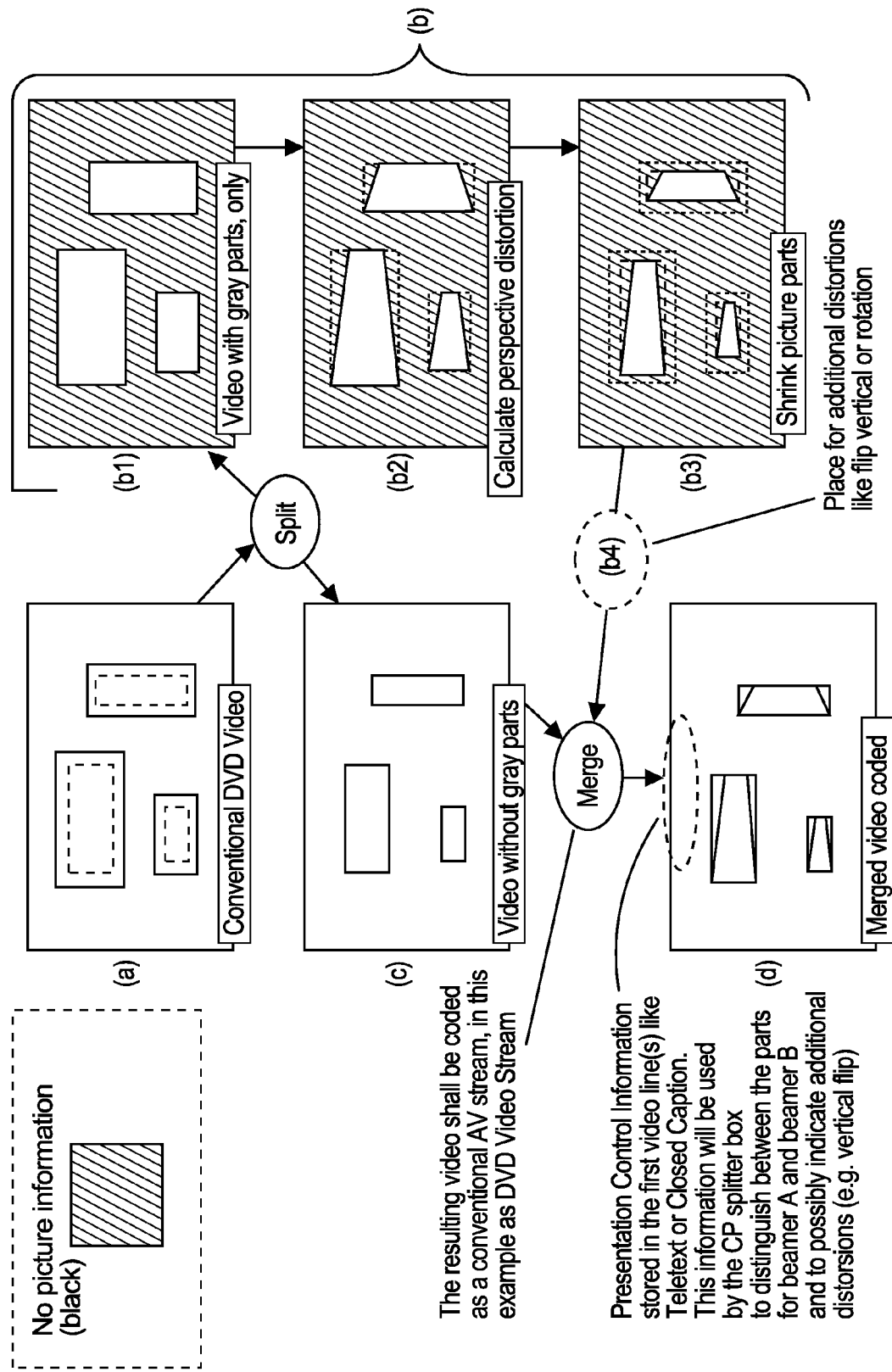

FIG. 6 shows a possible way of generating and transforming the appropriate inventive video stream, using e.g. MPEG4 Video encoding. The original video stream or picture is represented by screen (a) and contains three specific objects in this example. Each picture (video frame or field) is separated or partitioned into the two pictures (b) and (c). In picture (c) the three objects are replaced by correspond black picture sections. Picture (c) is kept as it is, for projection by beamer A. Picture (b) is intended for projection by beamer B and contains the omitted picture sections of picture (c) plus borders sections around these omitted picture sections. The other sections of picture (c) are set to black (i.e. are omitted) in frame (c). In several steps the picture sections that are marked grey or white in frame (b1) are shrank and distorted and may be flipped (e.g. vertically and/or horizontally). If the video stream is MPEG2 encoded or MPEG4 encoded, then the picture sections should consist of an integer multiple of macroblocks, and macroblocks of B frames should be preferred, i.e. picture sections which are not used for the reconstruction of other macroblocks of other frames. In frame (b2) the marked sections get a perspective distortion (corresponding to that introduced by beamer B on the silver screen). In frame (b3) the marked and distorted sections are shrank so as to fit into the omitted sections in frame (c). In the non-depicted frame (b4) the marked and distorted and shrank sections can be further distorted, e.g. by vertical flip and/or rotation. Following the processing from (b1) to (b3) or (b4), the sub frames (c) and (b3) or (b4), respectively, are overlapped, i.e. merged. The picture sections of (b) fit into the omitted sections of (c), i.e. there is no need of pixel mixing like alpha blending. From the thus resulting frames (d) the actual video stream is generated or encoded. This video stream may be recorded in a conventional manner, e.g. as an MPEG2 or MPEG4 video stream on a DVD Video disc. But advantageously, a playback on a conventional DVD Video player would lead to a significantly distorted video picture sequence.

Figure 8:
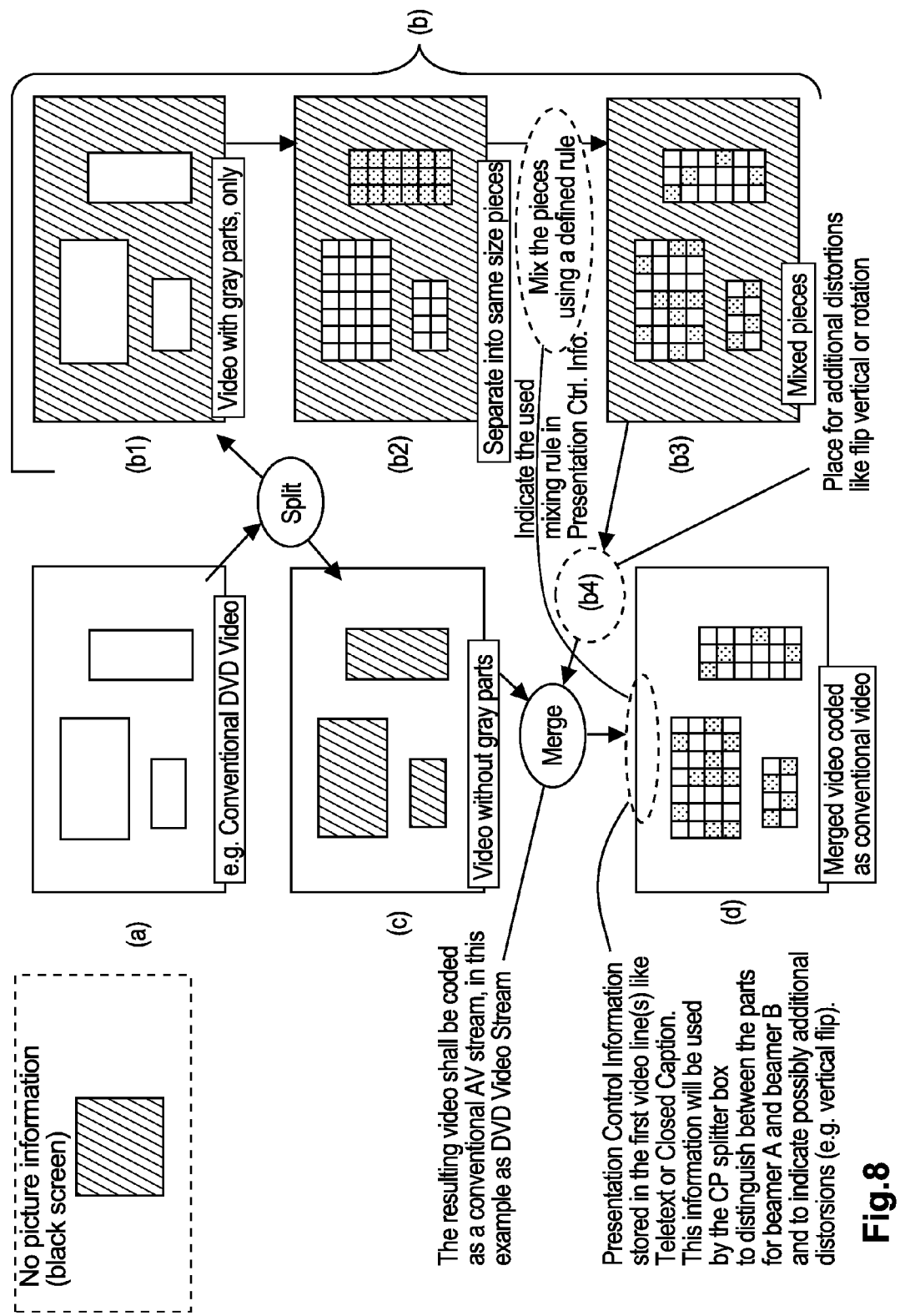

Additionally, some items of processing describing information are added to the video stream, e.g. in the format of teletext or closed caption information. This additional information is called presentation control information (PCI). This PCI information will control the CP splitter box to split and re-calculate (corresponding to the above described processing) the incoming video frames for the correct presentation via beamers A and B. For the projection, the CP splitter box needs not to distort the (b) picture sections but it expands and moves the (b) picture sections. Because of the distortion (b2) and shrinking (b3) steps, the resolution of the (b) picture sections for beamer B is lower than that of the picture (c) for beamer A. FIG. 8 shows a solution without this disadvantage.

Figure 26:
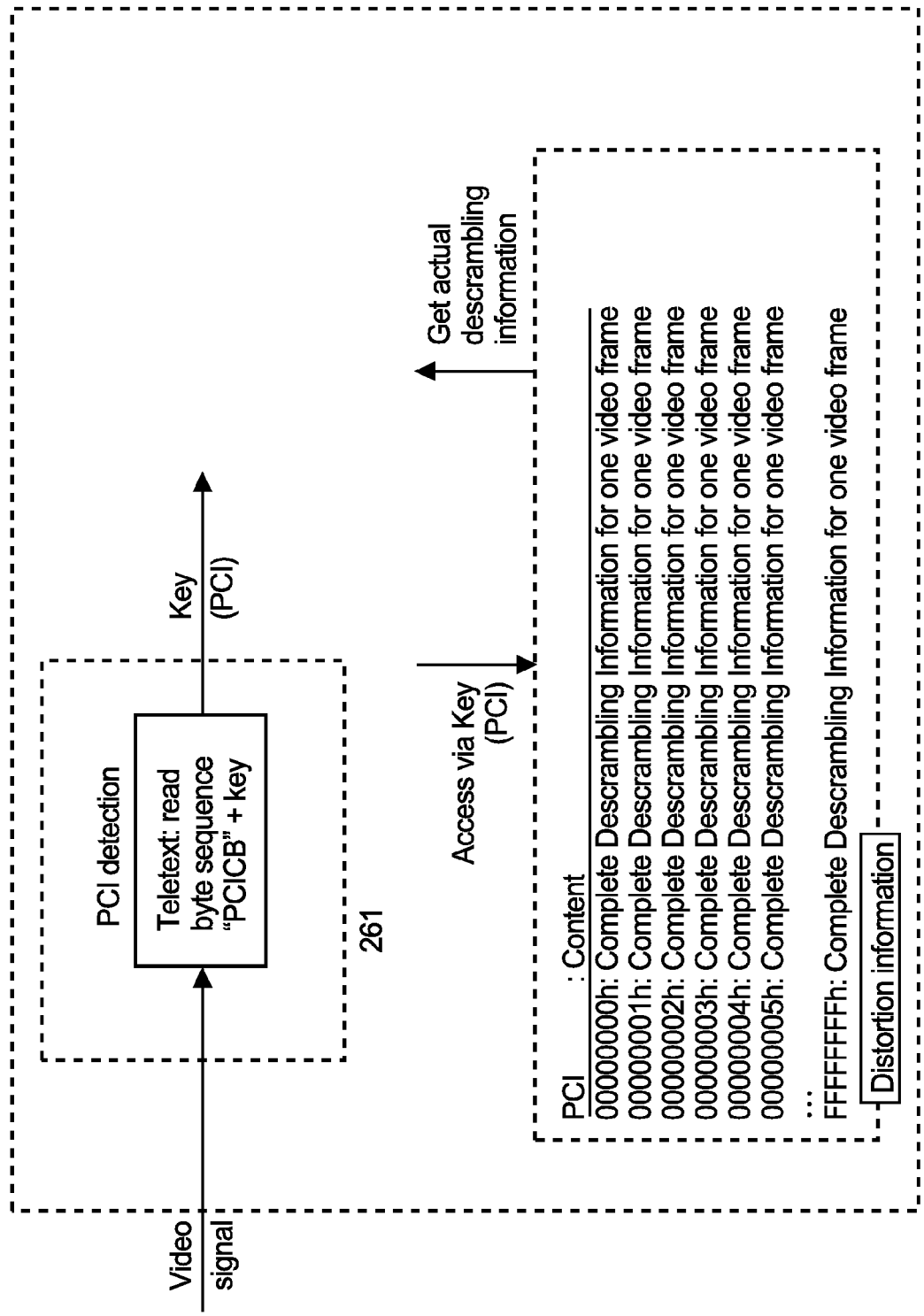

The PCI information may be separated into a key and the actual descrambling information as indicated by FIG. 26. In this case, the PCI in picture (d) consists of the key, and the actual descrambling information is stored in an extra memory. This descrambling information is provided to the CP splitter box, e.g. either hard coded or via flash memory. In the case of flash memory, the data should be encrypted in order to avoid hacker attacks.

Figure 7:
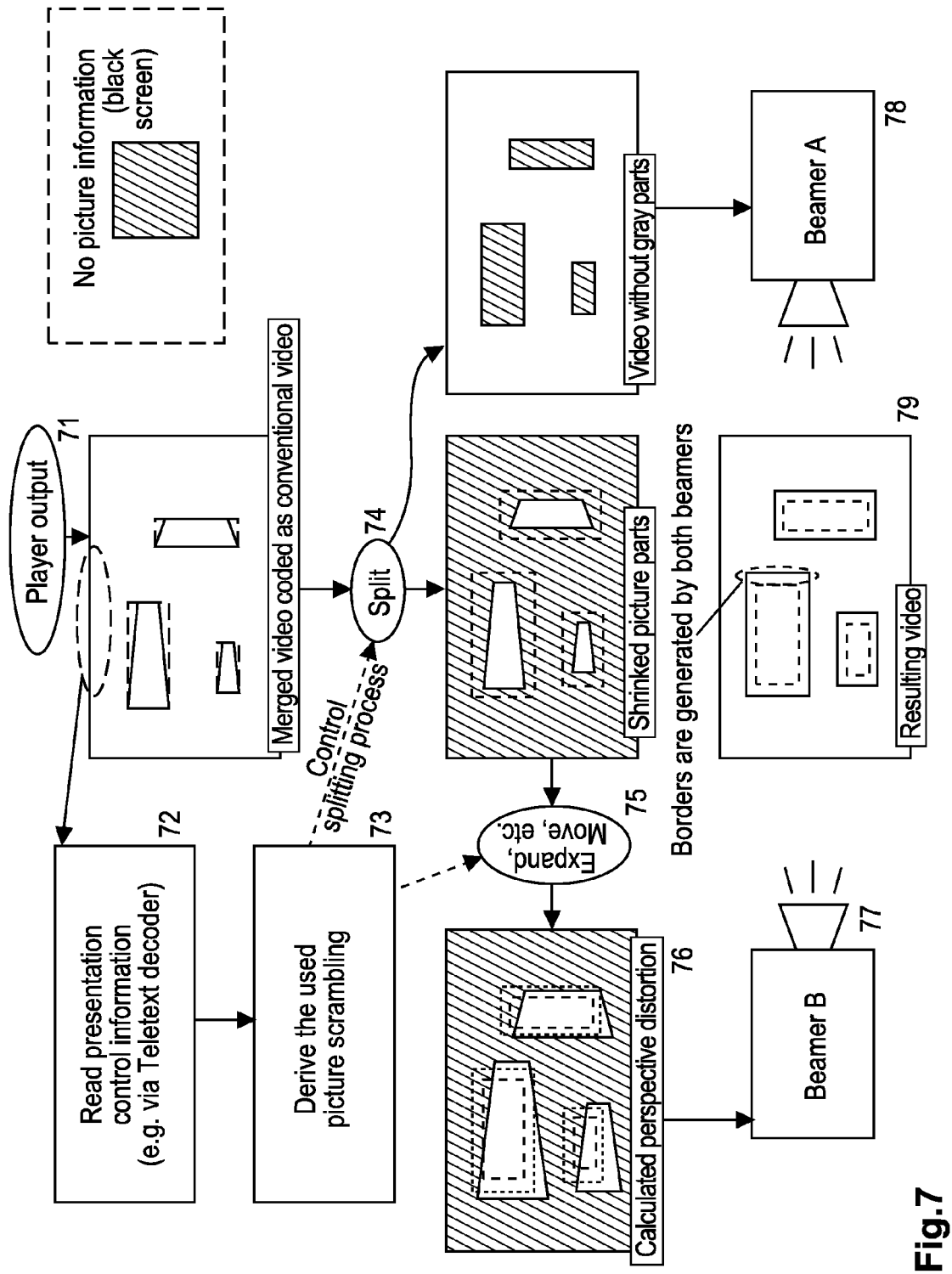

FIG. 7 shows the processing which is carried out in the splitter box during projection, based on the processing according to FIG. 6. The processing starts with the reception 71 of the player output video signal. Preferably, this output video signal has been generated or decoded by a prior art player, e.g. a DVD player. The CP splitter box regains 72 and analyses the presentation control information (PCI), e.g. by using a teletext decoder, to derive 73 the picture scrambling used. The PCI information is used to split 74 the signal into the beamer A and beamer B signals. The beamer B signal will be expanded and moved 75 and perspective distortion compensated 76 conforming to the content of the PCI information. Thereafter, beamers A and B will project 77, 78 their corresponding picture sections and the assembled video will appear on the silver screen.

The expanding and translating etc. processes may be performed using one single frame buffer only by realising all the calculations by pixel address calculation and pixel interpolation for beamers A and B, i.e. the steps shown represent the logical and hierarchical order, but may differ from the implementation for the CP splitter box hardware.

The borders between the picture sections as shown in picture 79 can be used to smooth the intersection between the assembled projections. I.e., the border of the projected picture section of a beamer fades out while the border of the projected neighbour picture section of the other beamer fades in, which makes the borders between the assembled projections more invisible.

FIG. 8 shows an alternative embodiment with respect to FIG. 6, i.e. a possible way to generate an appropriate inventive video stream (that is to be encoded e.g. according to the MPEG 4 standard). The original video stream is represented by screen (a) and contains three specific objects in this example. Each picture (video frame or field) is separated into the two pictures (b) and (c). In picture (c) the three objects are replaced by correspond black picture sections. Picture (c) is kept as it is, for projection by beamer A. Picture (b) is intended for projection by beamer B and contains the omitted picture sections of picture (c) plus borders sections around these omitted picture sections. Picture (b) is modified in several steps (b1) to (b4). Picture (b1) contains the exact omitted picture parts of (c). The picture parts in (b1) will be separated into pieces of the same geometrical size (b2). If the video stream is MPEG2 encoded or MPEG4 encoded, then the picture sections should consist of an integer multiple of macroblocks, and only macroblocks of B frames should be scrambled, i.e. picture sections which are not used for the reconstruction of other macroblocks of other frames. This would avoid the need of re-encoding macroblocks, i.e. the picture quality of the video would be kept unchanged after applying this copy protection process, i.e. only macroblocks are shifted inside the video stream and some vectors in the B frames need to be re-pointed. The location of the pieces is mixed in between the picture parts (see picture (b3)). Furthermore, the picture parts may be flipped (realised by lossless re-ordering of the cosine transformed values or coefficients (which is lossless only if such macroblock is intra coded) or rotated etc. in picture (b4). After this (b) pictures processing the pixel changes are only done within the geometrical boundaries of the (b) picture parts. So, the merging of pictures (b3) or (b4) and (c) is done without any overlapping process, e.g. alpha blending.

Additionally, some information is added to the video stream, e.g. teletext or closed caption information data. This data is called presentation control information (PCI). This information will control the CP splitter box to split and recalculate the incoming video frames for the correct presentation via beamers A and B.

In comparison to the processing shown in FIG. 6, this processing requires that the complete distortion is performed inside the CP splitter box, which increases the calculation efforts inside the CP splitter box. Technically, these calculations can be performed by on-board graphic accelerator chips of low-end PC motherboards. On the other hand, this makes the location of the beamer independent from the location of the scrambling of the video, i.e. the processing shown in FIG. 6 requires a relatively exact pre-selected location for beamer B during encoding the video stream (static beamer location), which is not required for the processing shown in FIG. 8 (dynamic beamer location).

The presentation control information data (PCI) may be separated into a key and the actual descrambling information as indicated by FIG. 26. In this case, the PCI in picture (d) consists of the key, and the actual descrambling information is stored in an extra memory. This descrambling information must be provided to the CP splitter box, e.g. either hard coded or via flash memory. In case of flash memory, the data can be encrypted in order to avoid hacker attacks.

Figure 9:
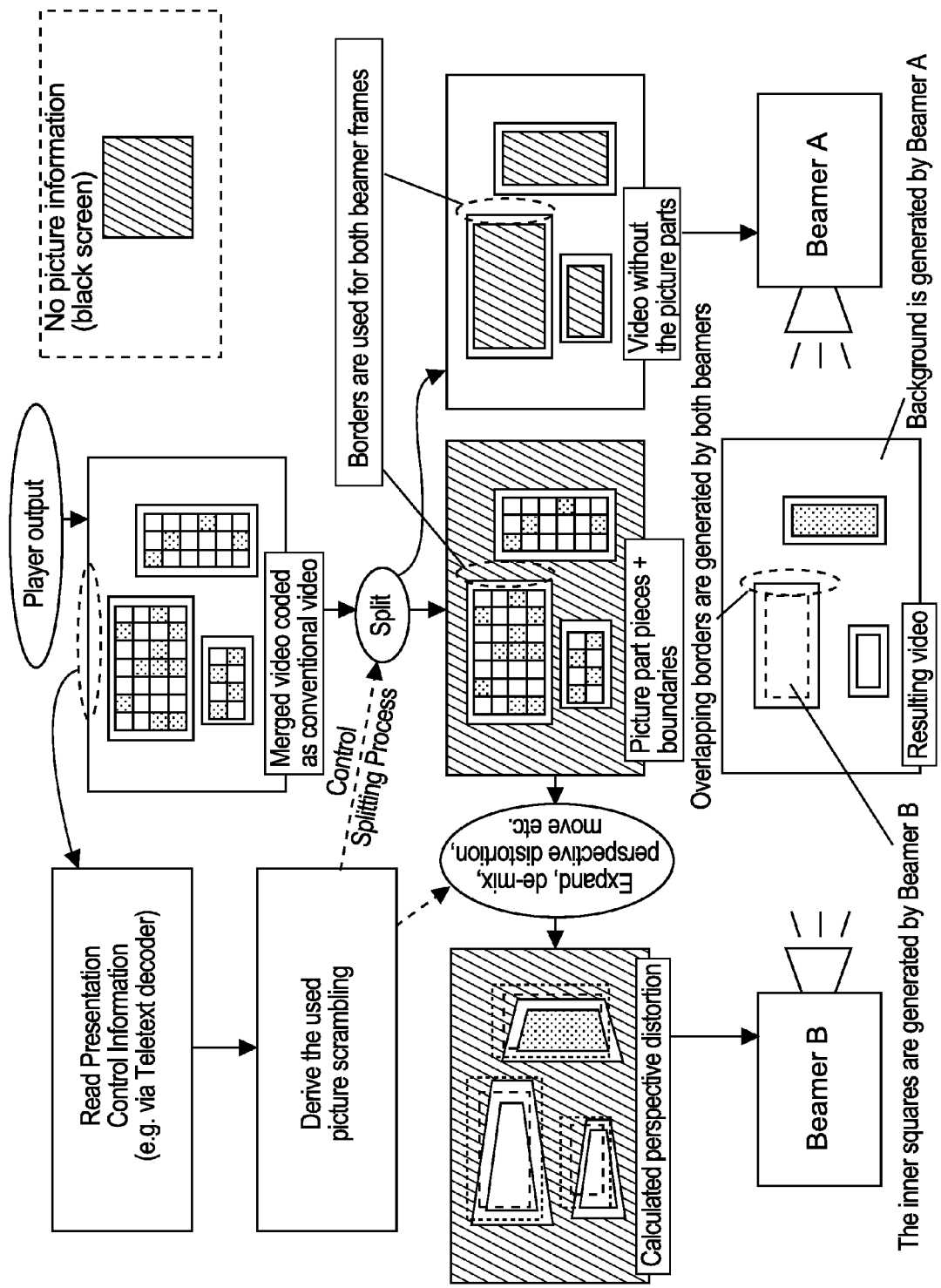

FIG. 9 shows the process which is being carried out in the CP splitter box in the processing according to FIG. 8. The processing starts with receiving the player output (video signal) which has been generated by a conventional player, e.g. DVD player. The CP splitter box analyses the presentation control information PCI, e.g. using a teletext or closed caption decoder. The presentation control information is used to split the total signal into beamer A and beamer B signals. Only the border between the picture sections and neighbour picture sections is served to both beamer pictures. The beamer B signal will be distorted and moved according to the presentation control information. Thereafter beamers A and B project their picture sections and the assembled video appears on the silver screen.

The distortion and/or translation etc. processes may be performed with only one single frame buffer by realising all the calculations by pixel address calculation and pixel interpolation for beamers A and B, i.e. the steps shown represent the logical and hierarchical order, but may differ from the realised order in the CP splitter box hardware.

The borders between the picture sections can be used for smoothing the intersections between the assembled projections, i.e. the border fades out from the projected picture section of a beamer until the neighbour omitted picture section (projected by the other beamer). This will better hide the crossing of the assembled projection.

Figure 10:
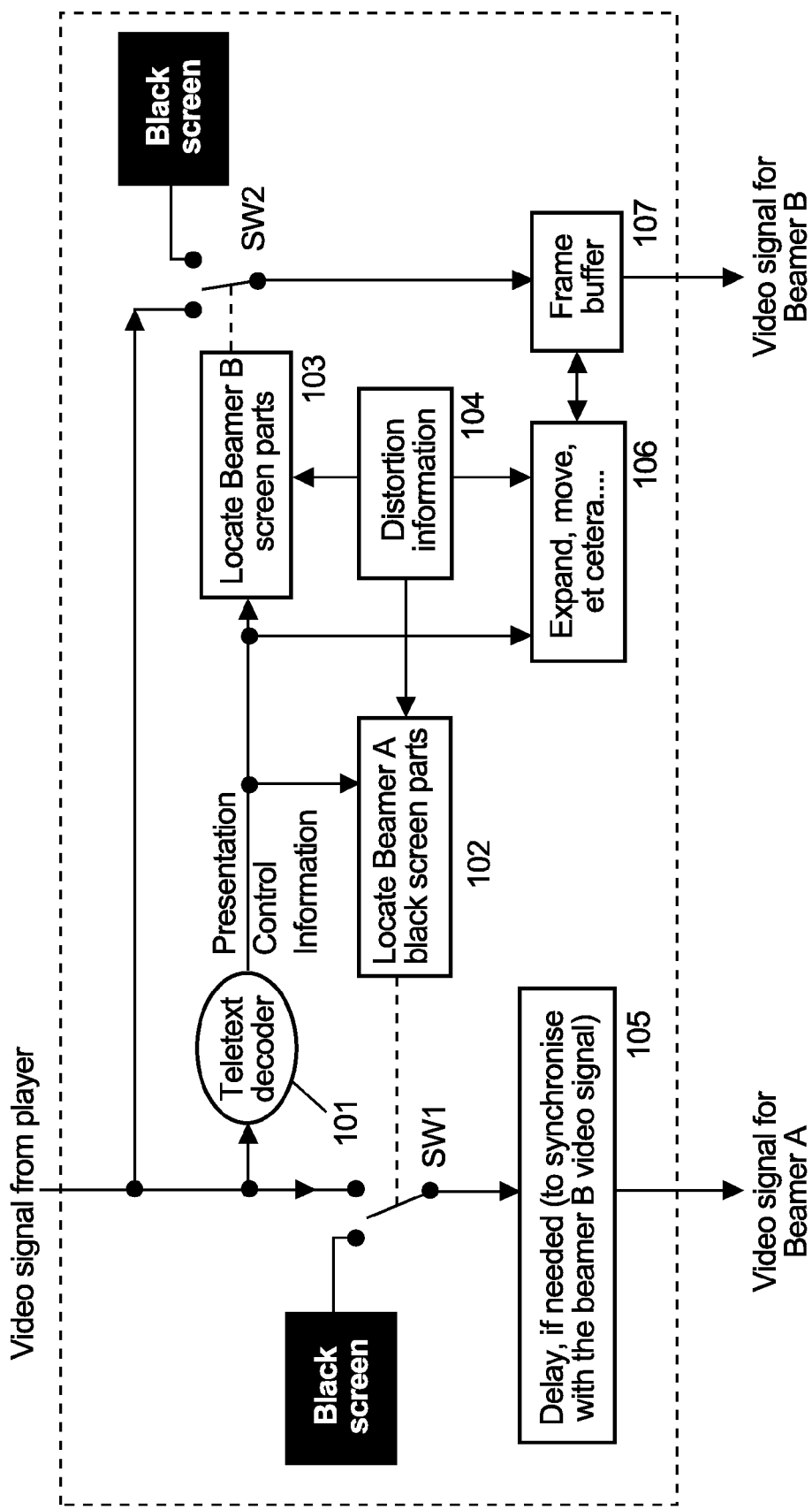

FIG. 10 shows a possible structure of processing units or functions in the CP splitter box. The video input signal is fed to a first switch SW1 and to a second switch SW2 and to a teletext or closed caption decoder or step 101, which decoder provides the resulting presentation control information PCI to a beamer A black screen sections locator 102 controlling switch SW1, to a beamer B screen sections locator 103 controlling switch SW2, and to a an optional expanding, translation, moving etc. step or stage 106. A distortion information data controller or generator or step 104 provides corresponding distortion information data to locators 102 and 103 and to step or stage 106. The other input of switches SW1 and SW2 gets a black screen video signal for mixing with black pixel values. Switch SW1 outputs the video signal for beamer A, possibly delayed by a delay 105 in order to synchronise it with the beamer B output signal. The output signal of switch SW2 passes through a frame buffer 107 that outputs the beamer B output signal. Frame buffer 107 is either controlled by step or stage 106 or by the PCI signal and the distortion information data. For simplification, obvious processes like A/D and D/A conversion are not shown.

Figure 11:
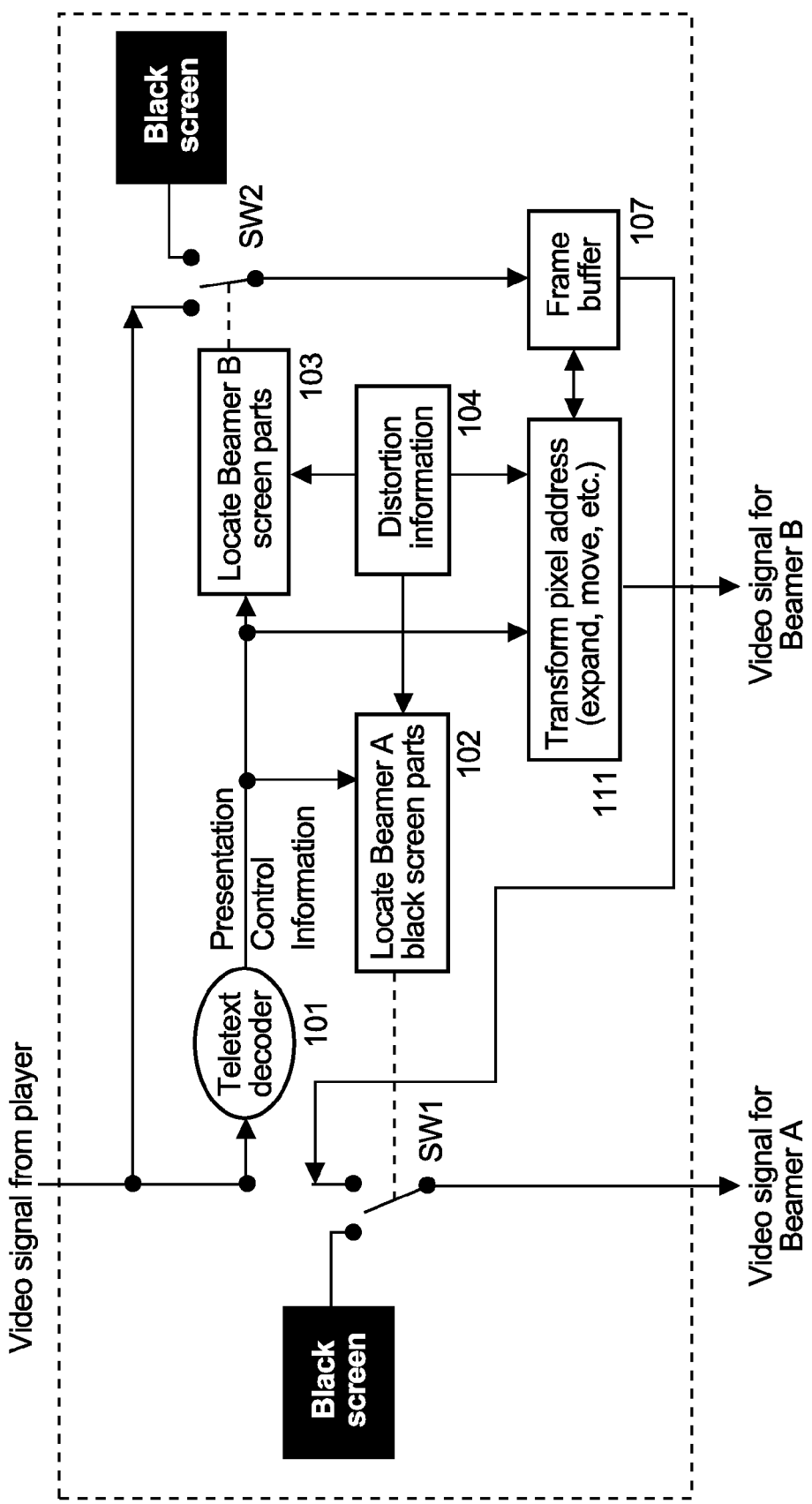

FIG. 11 shows a second embodiment for the CP splitter box of FIG. 10. All reference numbers have the same meaning. However, the frame buffer 107 does not output the video signal for beamer B but provides the input signal for the first input of switch SW1. The expanding, translation, moving etc. step or stage 106 of FIG. 10 is replaced by a pixel address transformer step or stage 111 which in addition receives a corresponding output signal from frame buffer 107 and which provides the video signal for beamer B. Again, the distortion information controls the mixing with black pixels and where the expansion and translation processes are done. Each pixel for beamer B is generated by calculating the appropriate pixels in frame buffer 107 and corresponding interpolations of the pixels, if so required. The advantage of this embodiment is, that there is no need for a delay between the video signals for beamers A and B. Again, obvious processes like A/D and D/A conversions are not depicted.

The distortion information (stage/step 104 in FIGS. 10 and 11) serves for keeping the security for the content providers. Therefore, the access to these information data can be encrypted. Embedding this information inside the CP splitter box provides a strong security level. Preferably, the memory 107 inside the CP splitter box is protected against a trivial access from a hacker. The memory can be embedded in the same chip where the descrambling is performed or, at least, the data should be encrypted by a special algorithm which is embedded in a chip of the CP splitter box. There should be no way to access the memory content from outside the box. In case external memory is used to add new distortion information to the CP splitter box, then the transported distortion information data should be encrypted as well, e.g. inside a flash memory. The decryption key should be embedded inside the CP splitter box in a manner invisible to the outside.

Figure 12:
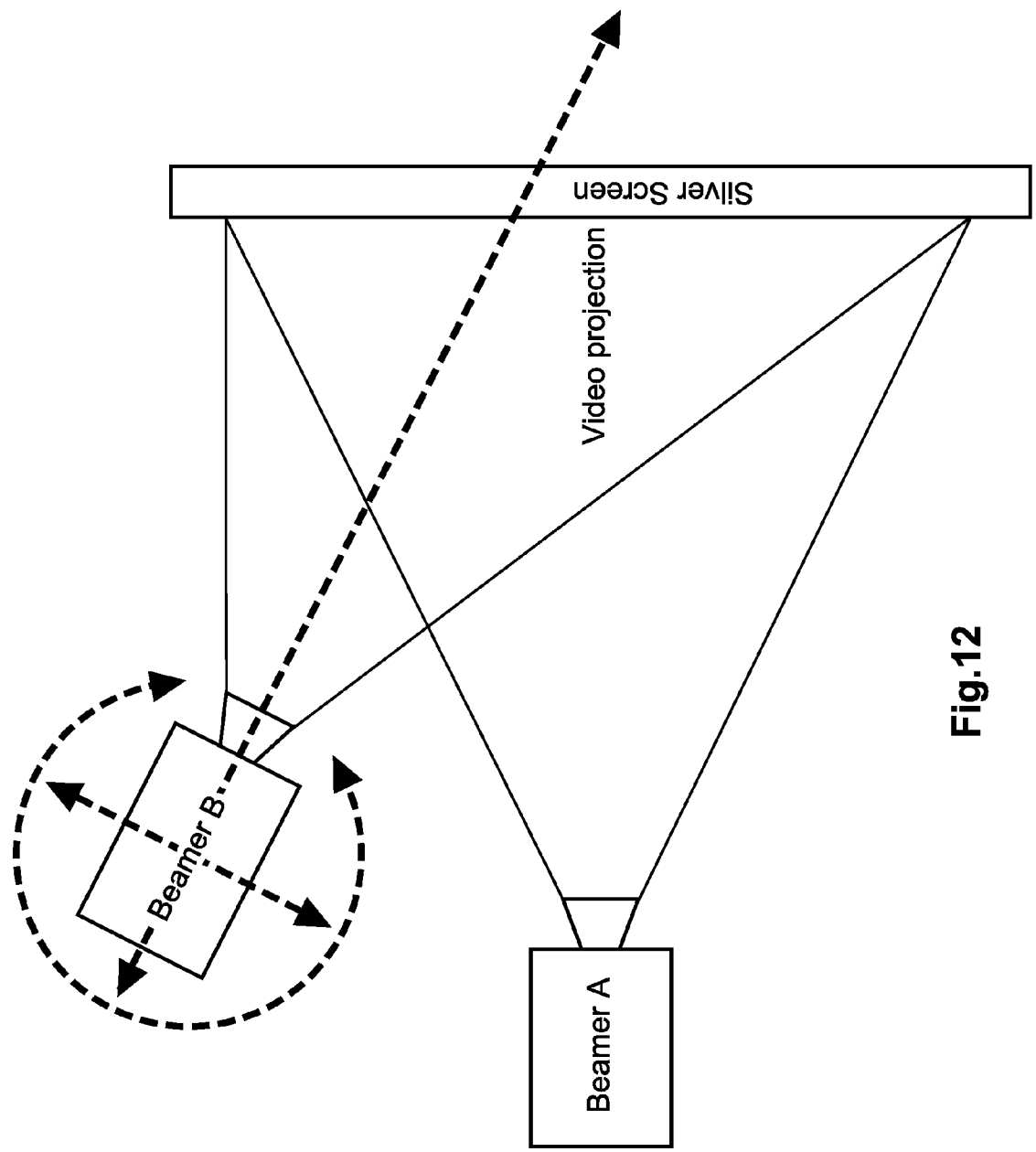

FIG. 12 depicts how beamer B can be moved to provide the desired perspective. The whole beamer may be rotated or moved up and down, and the front of the beamer may be moved up and down. However, the motions and rotations shown are the main motions to get beamer B correctly placed.

Figure 13:
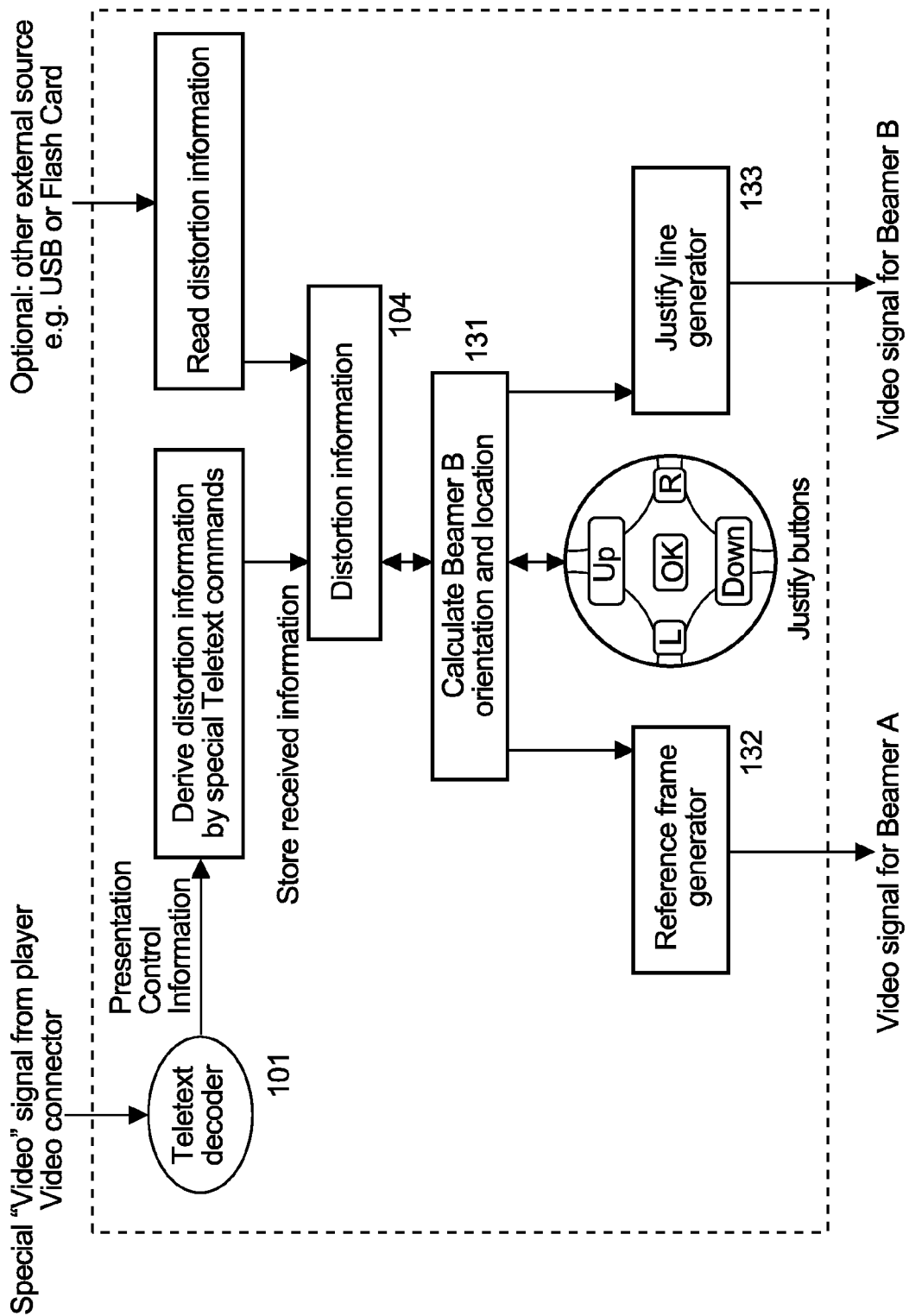

FIG. 13 shows the structure required for the CP splitter box to get prepared for the correct descrambling of the incoming (special) video signal. The user shall not be able to determine which picture sections have been changed and how these picture sections have been changed. Therefore the CP splitter box uses encrypted data in a special memory inside the box itself. There are different ways to get the encrypted data into the CP splitter box:
a) by reading special sections of the video disc, e.g. a special initialisation scene which contains encrypted distortion information data;
b) by receiving the distortion information data via USB or a flash card (data is encrypted);
c) the CP splitter box contains a ROM with (fixed) encrypted distortion information data;
d) by inserting a key for the CP splitter box via a special keyboard of the box.

Furthermore, FIG. 13 shows adjustment or adjusting buttons/keys which support the user during installation and arranging beamer B in order to get a correctly assembled projection of both beamers.

The following figures show how these buttons may be used to get beamer B on the right position.

Using the distortion information data and the input from the adjustment buttons, the orientation and position of/for beamer B is calculated in calculator 131. A reference frame generator 132 outputs a test or alignment video signal for beamer A, and an adjustment or adjust line generator 133 outputs a video signal for beamer B. The adjustment line generator 133 calculates the necessary correction information in case beamer B is not exactly located at the position foreseen at encoding side.

Figure 14:
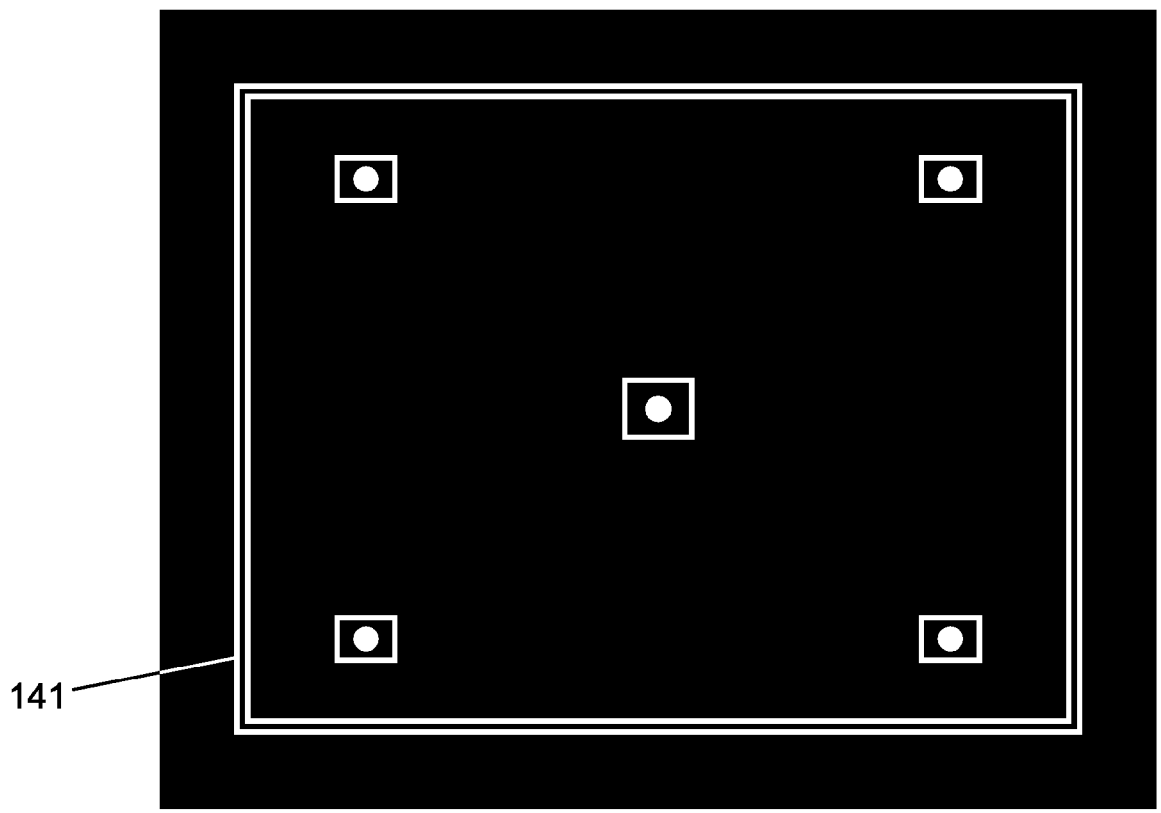

As a first embodiment for adjusting the beamers, FIG. 14 depicts two overlapping test or reference pictures to be used for adjusting beamers A and B manually by moving beamer B, i.e. a special assembled projection is provided. The picture generated by beamer A includes squares whereas the picture generated by beamer B includes circles. Beamer B is to be rotated and moved until the circles are presented within the corresponding squares. The test pictures projected by beamers A and B can also contain an encapsulating square or frame 141, which shall overlap as far as possible. If the assembled projection is as shown in this figure, then beamers A and B are well adjusted, i.e. the actual presentation (video playback) may start. It is up to the user to arrange both beamers properly to get this assembled screen.

Figure 15:
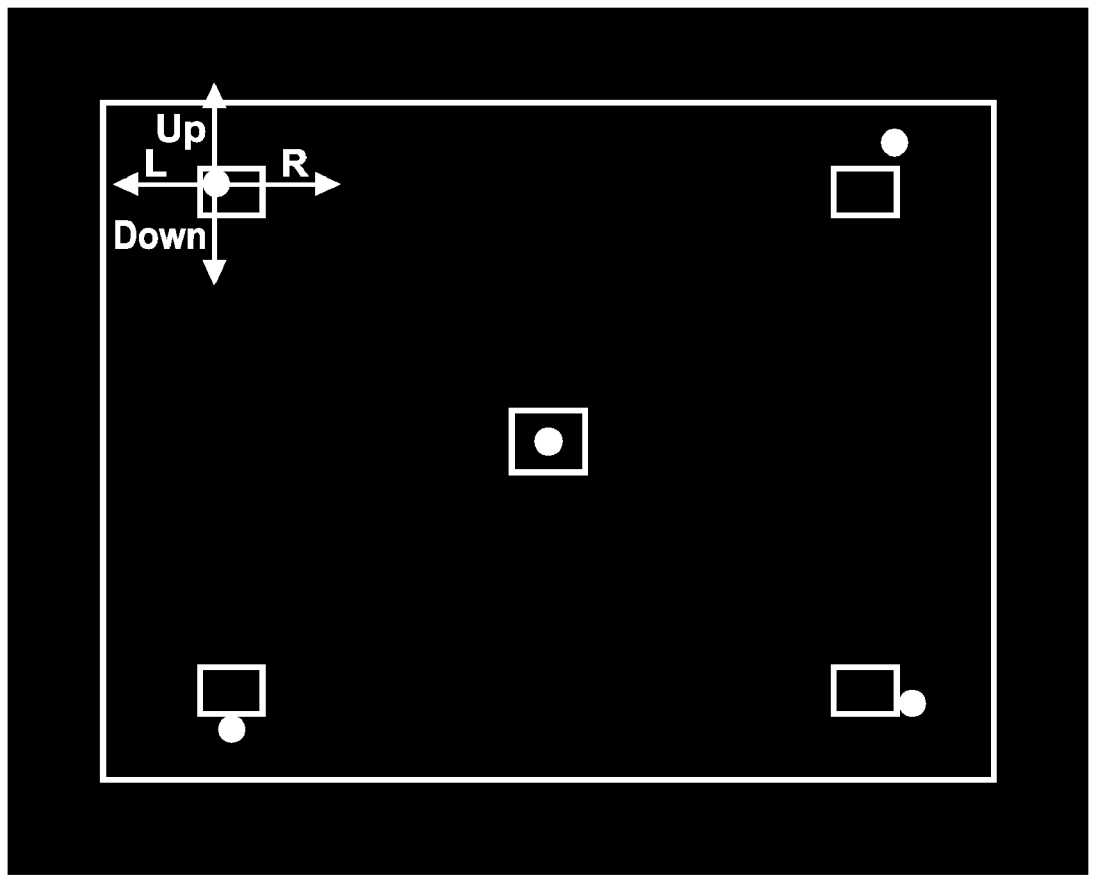

As a second embodiment for adjusting the beamers, FIG. 15 depicts two overlapping test or reference pictures to be used for adjusting beamers A and B by a user pressing corresponding adjustment buttons. Again, the picture generated by beamer A includes squares whereas the picture generated by beamer B includes circles, arrows and text. If the assembled projection is similar to that of FIG. 14, then the last refinement adjustment shall be done via a special fine adjustment process. This fine adjustment is realised by moving the corner circles to the proper exact position, inside the corresponding squares.

Step 1 of 4 steps: beamer B is arranged such that its circles are close to their according beamer A squares, whereby the centre circle shall be placed best, i.e. the adjustment may start with manually arranging beamer B so that the middle or centre circle fits right into the middle or centre square, e.g. via navigation buttons or keys on the CP splitter box or on a remote control. Thereafter for example the upper left circle is adjusted using corresponding buttons. When done, press 'Ok' and continue with FIG. 16.

Figure 16:
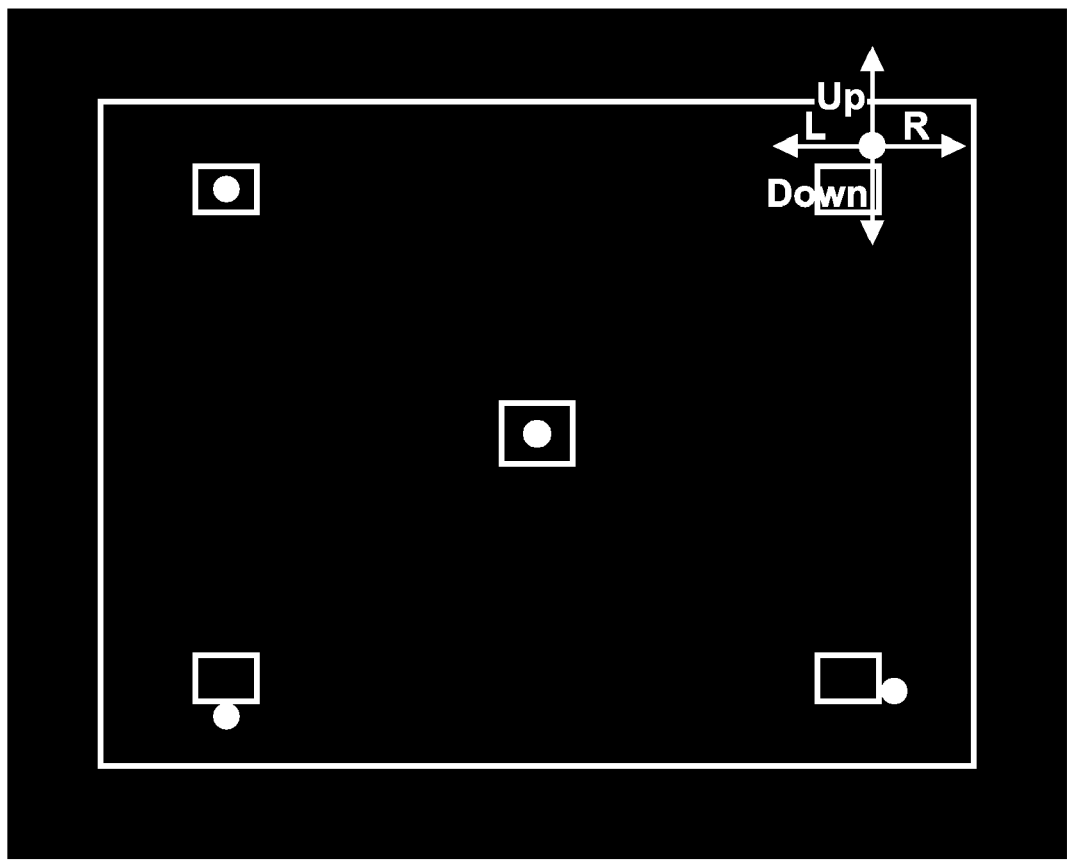

FIG. 16 shows step 2 of 4. For example, the upper right circle is adjusted, e.g. via the navigation buttons. When done, press 'Ok'. Because of the now available information, the circles in the lower half of the silver screen could be roughly adjusted automatically by calculating from the correct points found the required information for the remaining picture sections. In case the manual-only adjustment is to be finalised, continue with FIG. 17.

Figure 17:
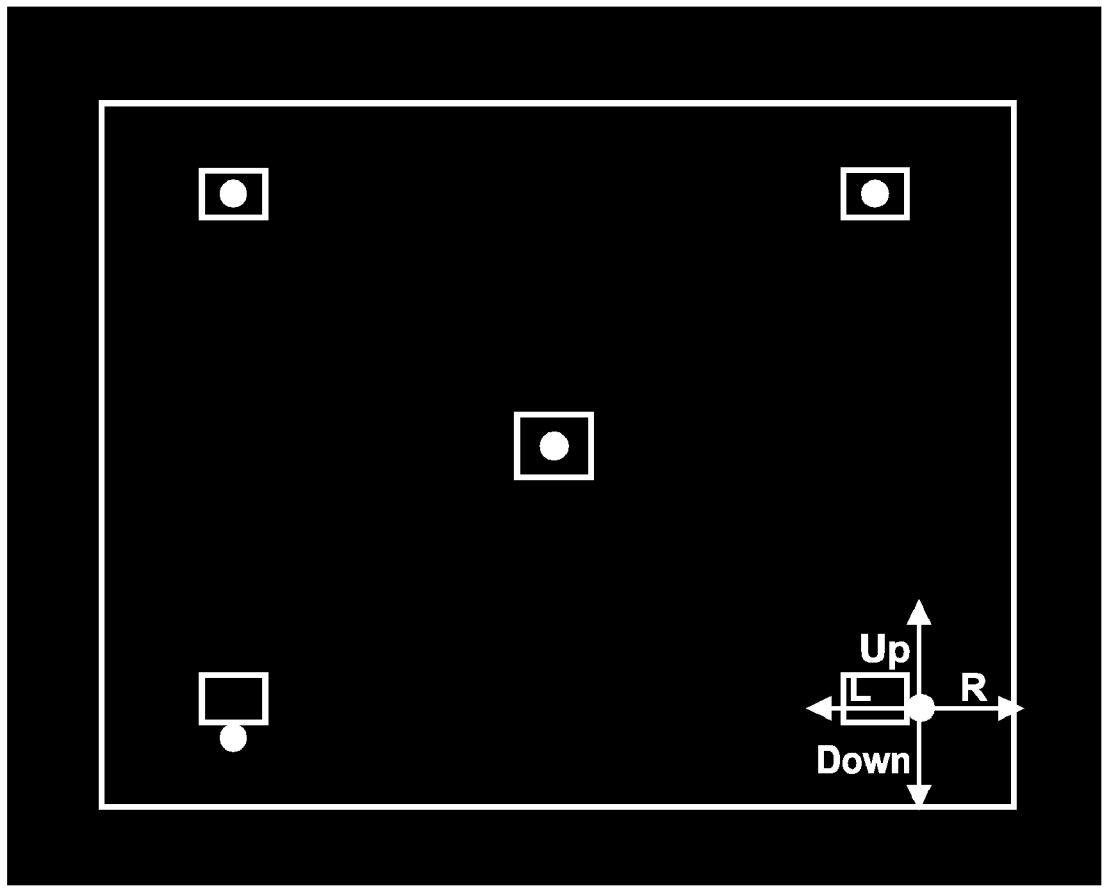

FIG. 17 shows step 3 of 4. For example, the lower right circle is adjusted, e.g. via the navigation buttons. When done, press 'Ok'. Continue with FIG. 18.

Figure 18:
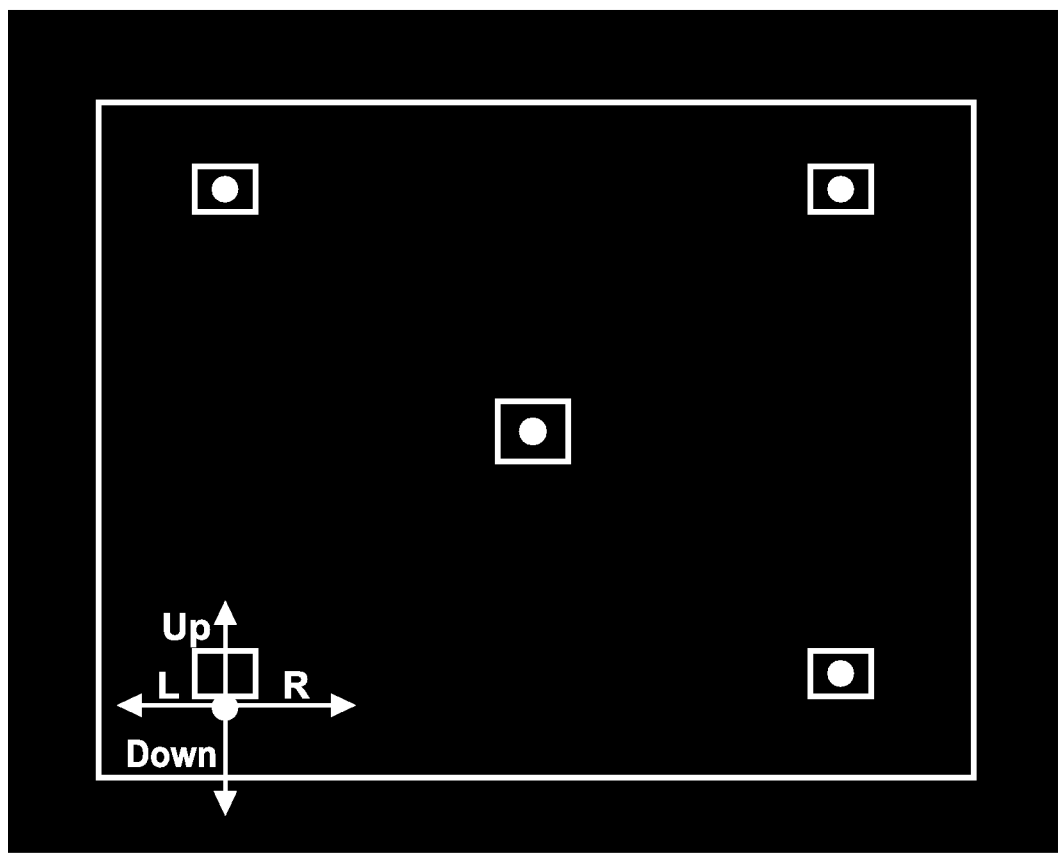

FIG. 18 shows step 4 of 4. The remaining circle, e.g. the lower left circle, is adjusted e.g. via the navigation buttons. When done, press 'Ok' and continue with FIG. 19.

Figure 19:
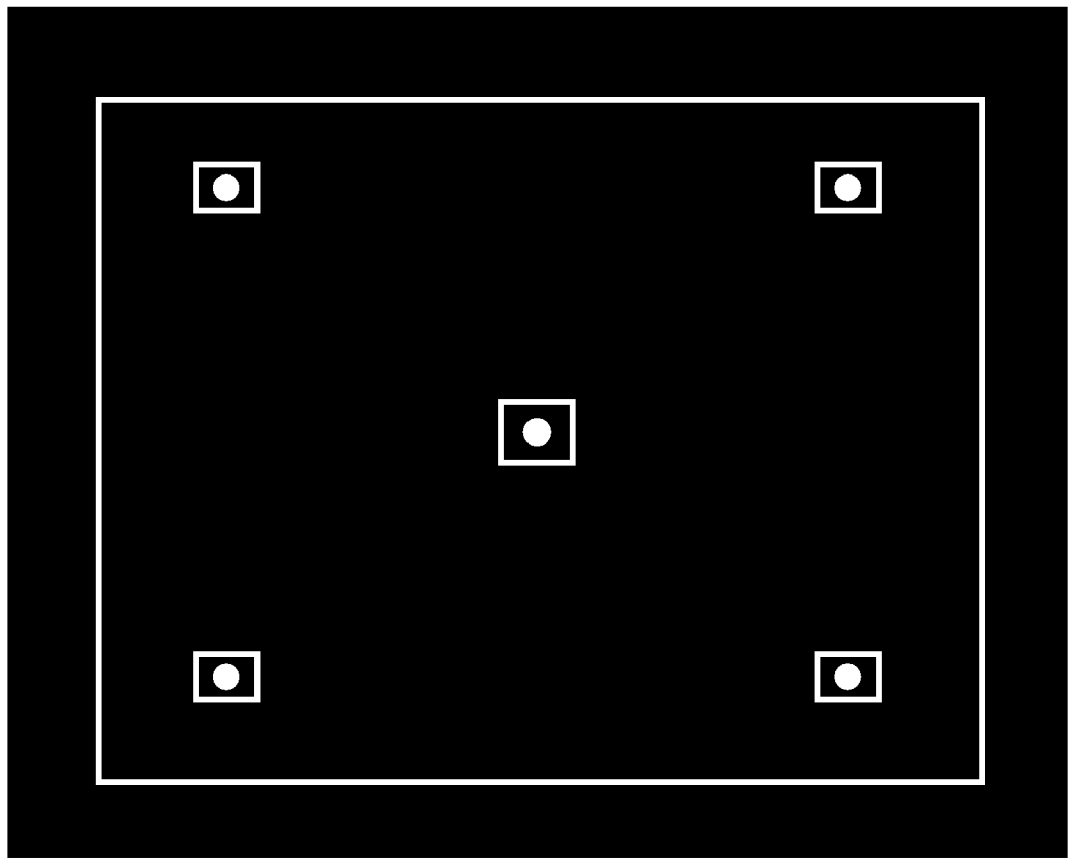

Following all the previous adjustments, the assembled projections should look like that in FIG. 19, i.e. basically like that in FIG. 14. At this point, the CP splitter box has all necessary information for generating the video signals for both beamers properly, and is ready for normal video playback. This processing fits very well to that described in connection with FIGS. 8 and 9.

In case the CP splitter box shall carry out a processing according to FIGS. 6 and 7, the CP splitter box needs additional processing power to facilitate the required dynamic projection perspectives.

Figure 20:
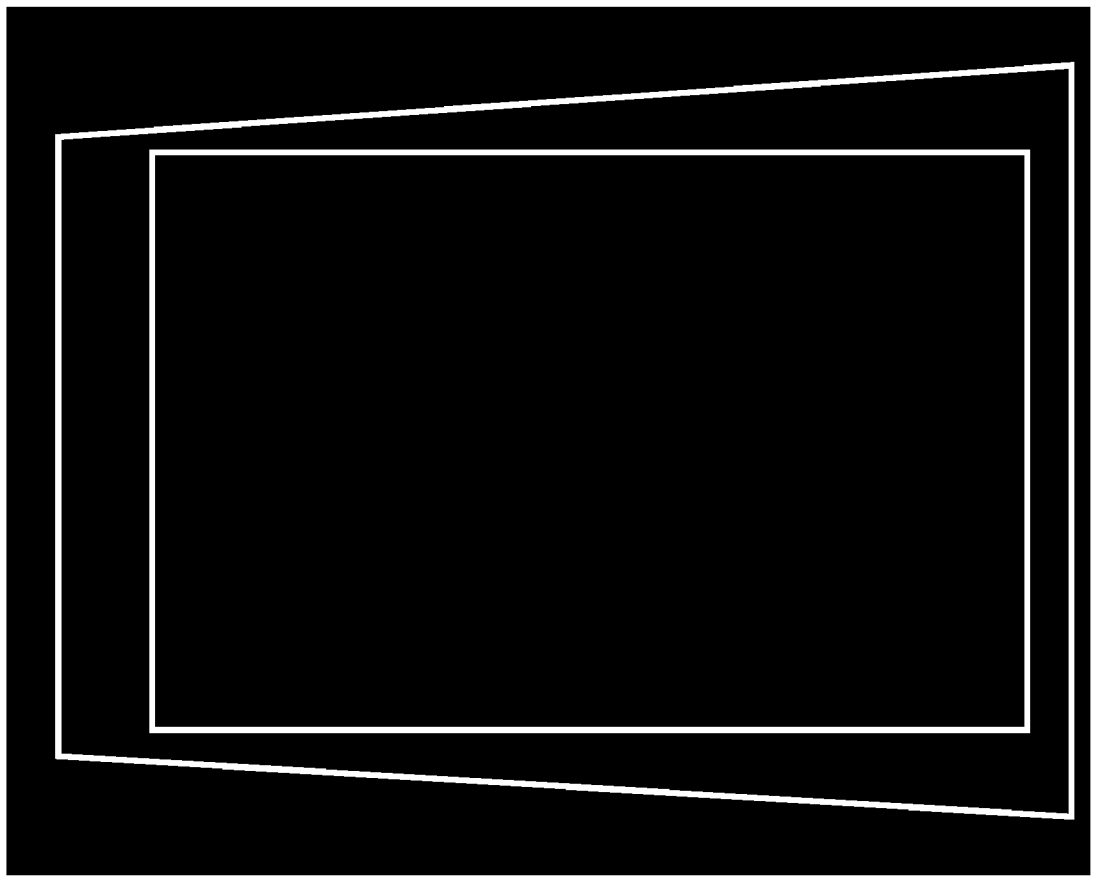

As a third embodiment for adjusting the beamers, FIG. 20 depicts two alternative overlapping test or reference pictures to be used for adjusting beamers A and B by a user pressing corresponding adjustment buttons e.g. on the CP splitter box. The picture projected by beamer A contains a white square whereas the picture generated by beamer B projects a white trapezoid.

Step 1 of 4 steps: in a coarse adjustment, beamer B is to be arranged such that the white trapezoid just covers the whole white square of beamer A. Thereafter the user presses 'Ok' on the adjustment button (see FIG. 13) to enter the next adjustment level, and continues with FIG. 21.

Figure 21:
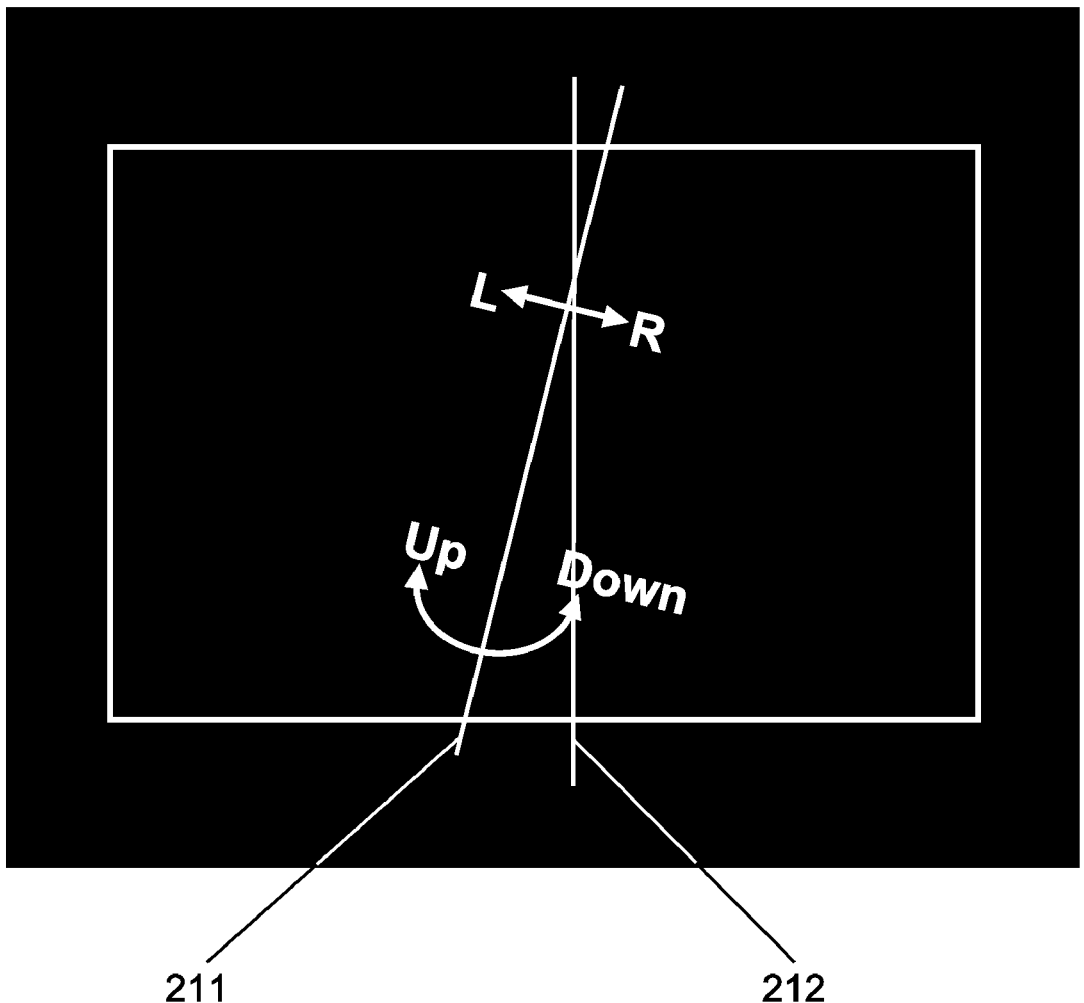

FIG. 21 shows step 2 of 4. Following the coarse adjustment as described in FIG. 20, the detailed adjustment starts. Beamer A projects a vertical reference line 212. Beamer B also projects a line 211, which shall be vertical. Normally, the vertical line of beamer B does not fully overlap the vertical line of beamer A. By using the adjustment buttons e.g. on the CP splitter box, the vertical line 211 of beamer B is repositioned (by translation and rotation) so as to overlap the vertical line 212 of beamer A.

The following adjustment buttons may be used:
'L'=move left
'R'=move right
'Up'=clockwise rotation
'Down'=counter-clockwise rotation.

In this example, some 'Down' and some 'R' pressing is required. After achieving such overlapping, the user presses 'Ok' and continues with FIG. 22.

Figure 22:
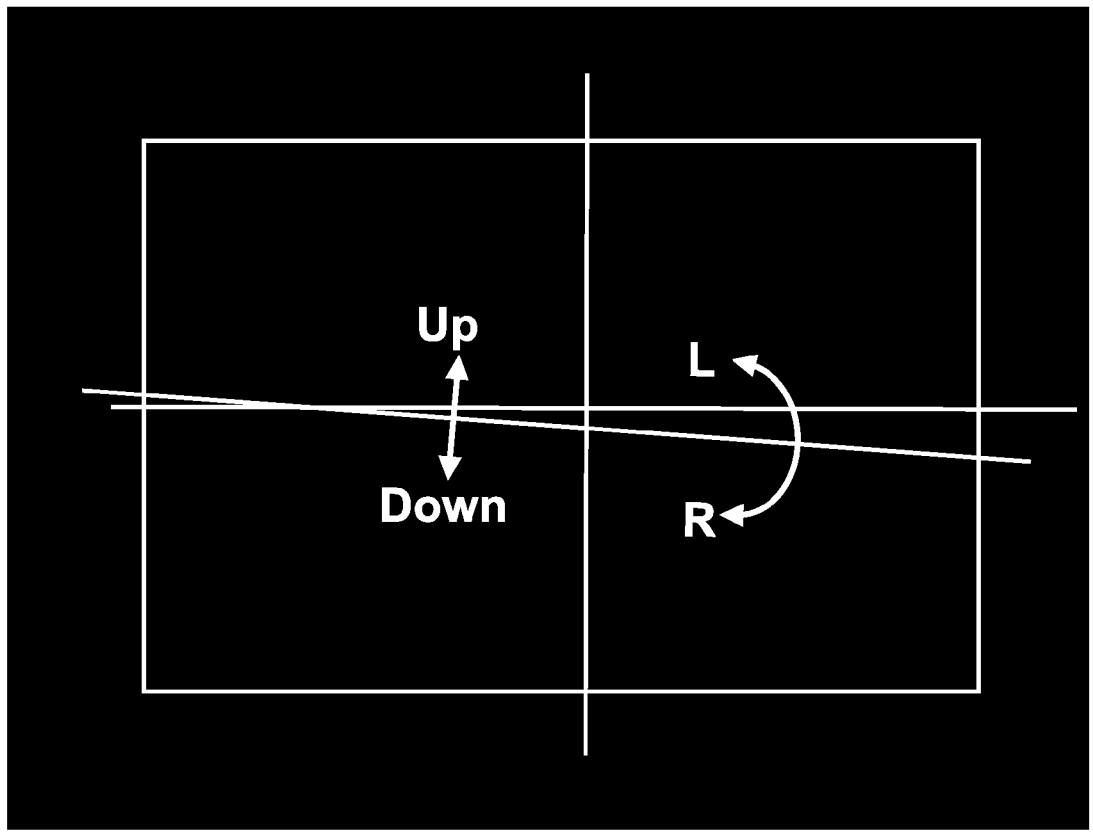

FIG. 22 shows step 3 of 4. The adjustment of the vertical line was successful as shown in this figure. Beamer A projects a horizontal reference line. Beamer B also projects a line, which shall be horizontal. Normally, the horizontal line of beamer B does not fully overlap the horizontal line of beamer A. By using the adjustment buttons e.g. on the CP splitter box, the horizontal line of beamer B is repositioned (by translation and rotation) so as to overlap the horizontal line of beamer A.

The following adjustment buttons may be used:
'Up'=move up
'Down'=move down
'R'=clockwise rotation
'L'=counter-clockwise rotation In this example, some 'Up' and some 'L' pressings are required. After achieving such overlapping, the user presses 'Ok' and continues with FIG. 23.

Steps 2 and 3 may be exchanged.

Figure 23:
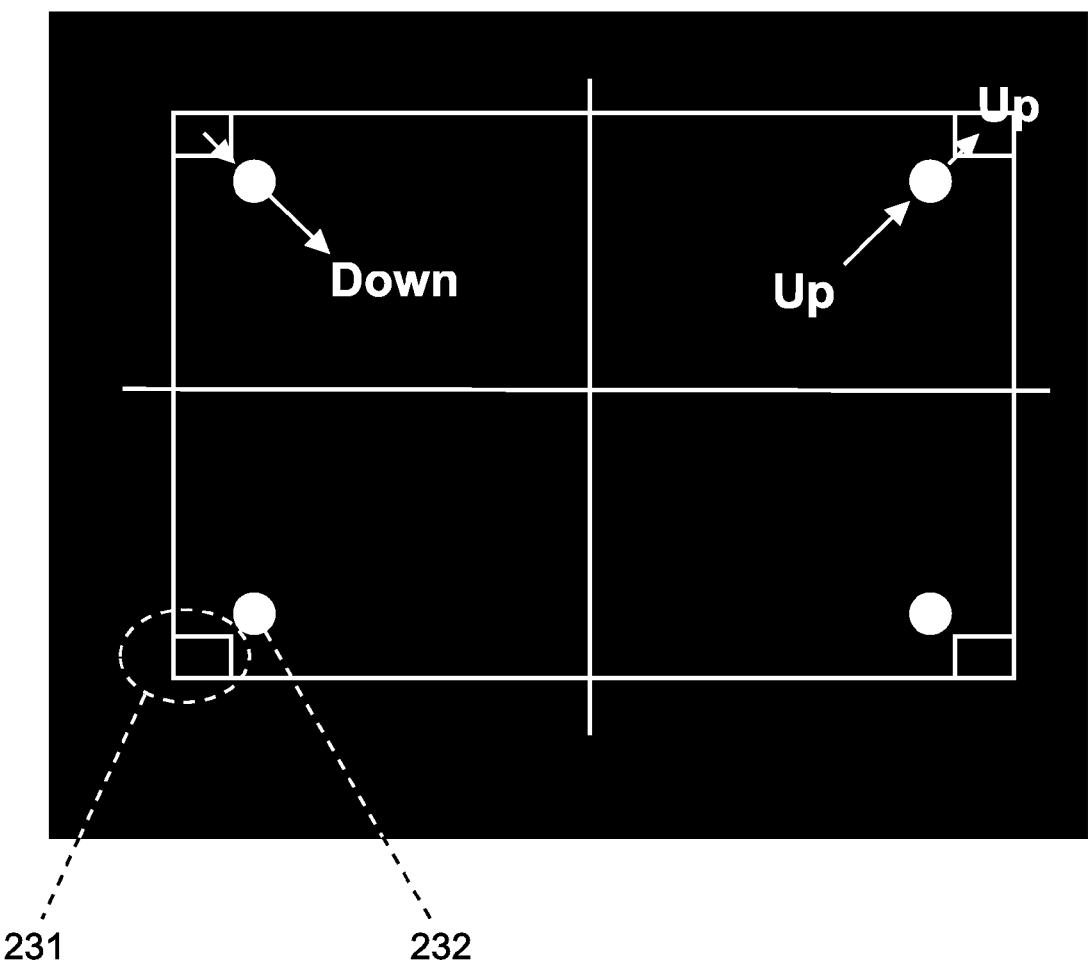

FIG. 23 shows step 4 of 4. Following horizontal and vertical adjustment the scaling of the projection needs still to be adjusted. To achieve this, beamer B can project four circles 232 together with corresponding arrows and 'Up' and 'Down' text. The user presses the adjustment buttons to move these circles into the corresponding rectangle 'homes' 231 projected by beamer A. In this example, some 'Up' pressings are required. When the four circles are inside these four squares, the processing continue with FIG. 24.

Figure 24:
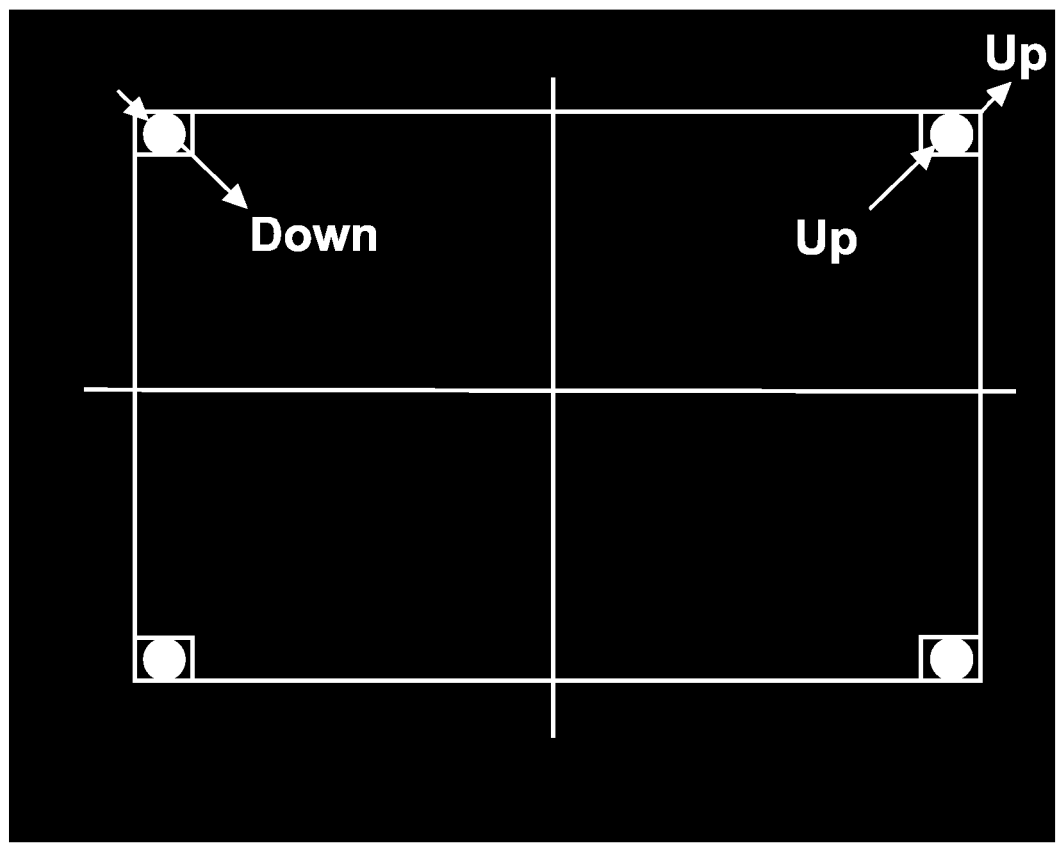

Following step 4, the assembled projections should look like that in FIG. 24, i.e. the 4 circles are within the 4 squares and the vertical and horizontal centre lines of beamers A and B are well overlapped. The CP splitter box has now all necessary information and is ready to produce an adequate projection for video playback. However, if there is a strong distortion of beamer A and/or B, these lines may not overlap perfectly. The processing shown corresponds very well to the processing shown in FIGS. 8 and 9. If the CP splitter box shall handle the method as shown in FIGS. 6 and 7, then the CP splitter box needs additional processing power to realise the required dynamic projection perspectives.

Figure 25:
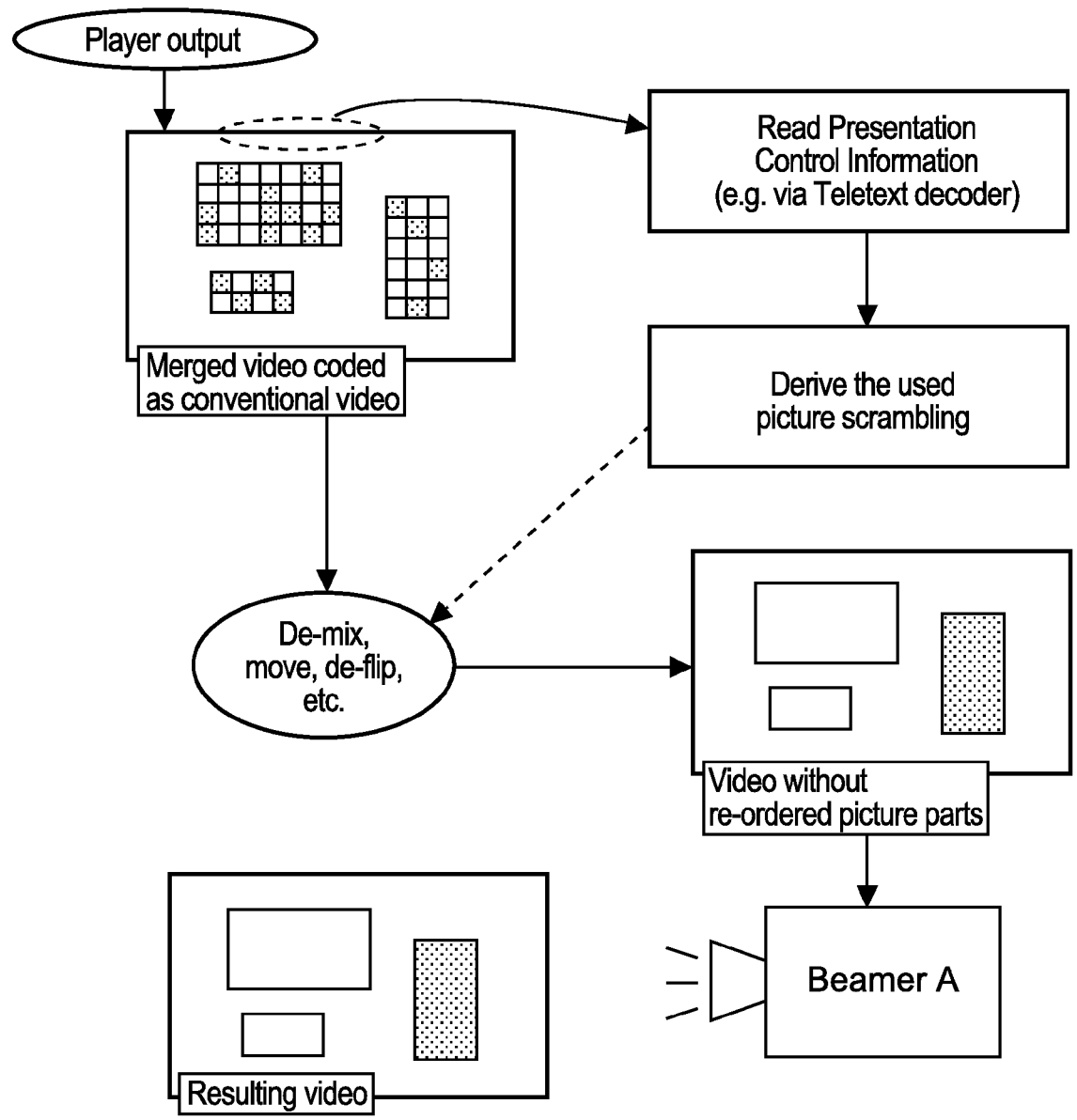

FIG. 25 shows a process which is performed in the CP splitter box in case of a FIG. 8 processing in which a single beamer only is used. A player output video signal is received that has been generated by a conventional player, e.g. DVD player. The CP splitter box analyses the presentation control information data included therein, e.g. using a teletext decoder. The presentation control information is used to derive the picture scrambling used, to e.g. de-mix, move, de-flip, etc. in the merged video coded as conventional video each picture section according to the presentation control information. Thereafter beamer A projects the video with re-ordered picture sections. This re-arranged resulting video appears on the silver screen.

This process is a simplified process in comparison to the FIG. 9 processing. It is not as secure as the example described in FIG. 9. The CP splitter box operating in the one-screen mode (only beamer A) facilitates protecting digital video against perfect 1:1 copies, but making an analog copy of the video sequence is still possible.

A CP splitter box may support both modes (one beamer and two beamers). For trustworthy customers, the simple solution (one beamer) may be sufficient. But for other customers the two-beamer solution is applied.

FIG. 26 shows a presentation control information data detector 261 and the distortion information data 104 as shown in FIGS. 10 and 11. The PCI detector 261 decodes the PCI code in the video signal. If the PCI detector recognises a special identification code (e.g. 'PCICB'), then the PCI detector knows that the following bytes of the detected PCI code contain the presentation control information PCI data. The PCI is only a key. The descrambling sections of the CP splitter box are using this key to get the actual descrambling information, which is stored in the distortion information data. This distortion information contains a table. For each PCI the table in the distortion information delivers the appropriate descrambling information as shown in FIGS. 10 and 11.

The advantage of the separation into keys and distortion information is as follows:
a) The key needs only a very small section of the memory space, which is needed for each entry in the distortion information. This makes it possible that the video signals for only one single video frame is sufficient to provide the whole key. This facilitates a frame-per-frame descrambling.
b) Without significant effort, a hacker could access and decode the key. But the hacker would not be able to access to the distortion information because it is not accessible from outside the CP splitter box, i.e. the distortion information is protected by the CP splitter box hardware. Due to the fact that the distortion information contains the actual descrambling information, knowing the key is worthless for the hacker. That makes the CP splitter box very secure. Even if the hacker would find out the descrambling information for one key, all the other keys are not known (in this example: $2^{32}-1$ keys), i.e. the hacker would need to hack each single key. A 2-hour MPEG2 video contains about 135000 B-frames, i.e. 135000 possible keys. If also I- and P-frames were used for scrambling, then even 216000 keys would be applicable.

Figure 27:
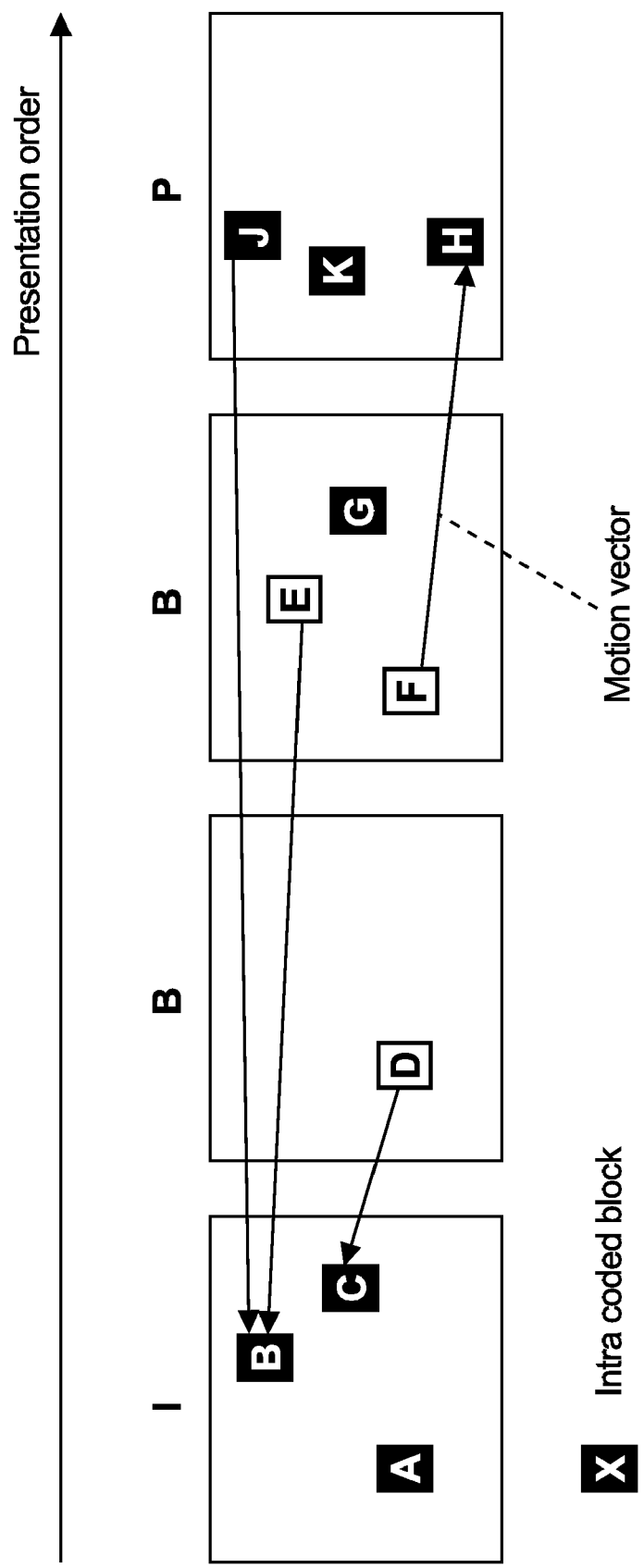

FIG. 27 shows an excerpt of a frame sequence of an MPEG2 or MPEG4 or MPEG4 AVC encoded video stream. The I-, P-, and B-frames/fields/pictures are separated into pixel blocks or macro-blocks. A block may be intra-coded, or predicted coded using a difference block (see the MPEG2 Video, MPEG4 Video and MPEG4 Video AVC specifications for details). The black squares represent intra-coded (I) pixel blocks or macro-blocks whereas the shaded or grey blocks represent predicted encoded (P, B) pixel blocks or macroblocks.

Figure 28:
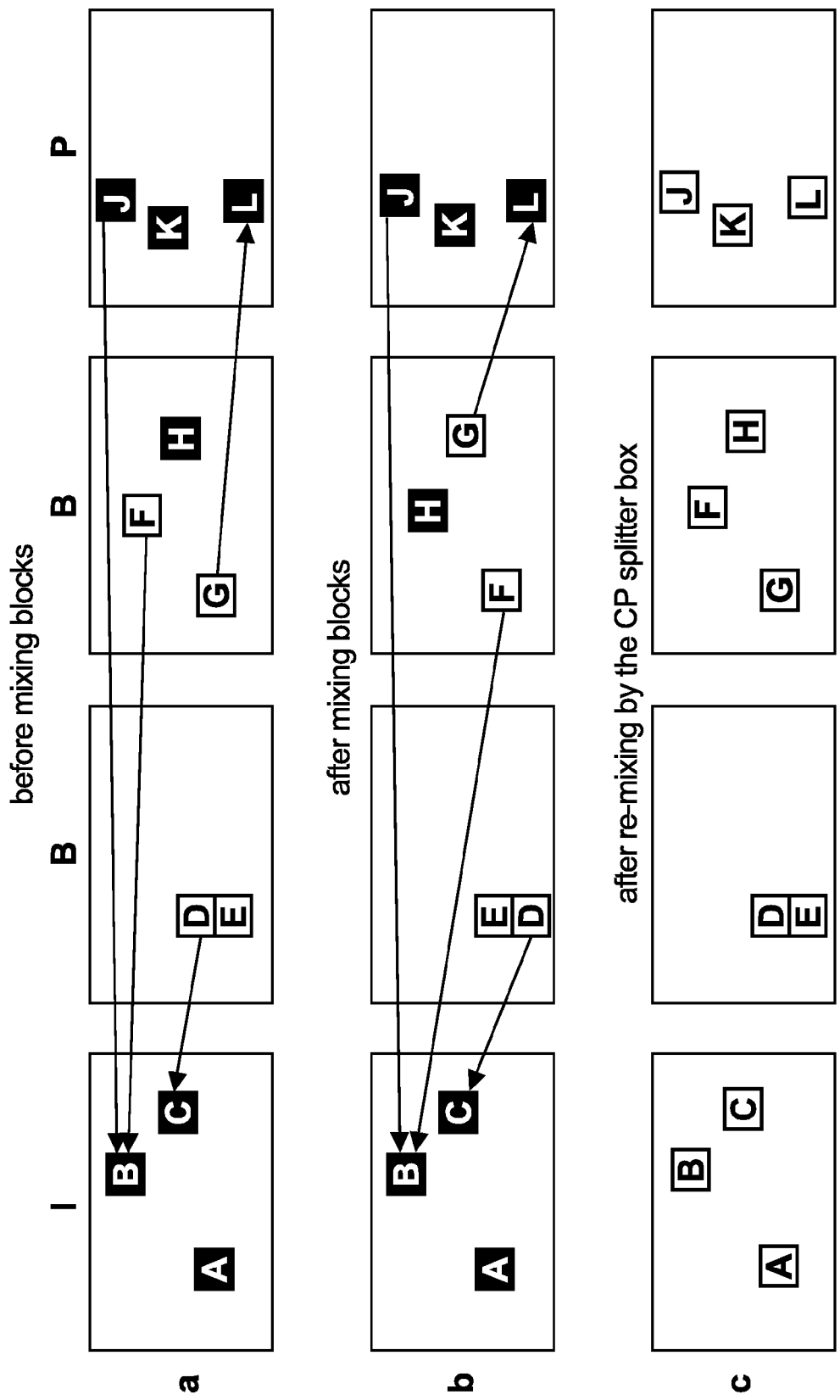

The mixing step from picture (b2) to (b3) described in connection with FIG. 8 is preferably performed with pixel blocks or macro-blocks of B frames. The reason is, that other pixel blocks or macro-blocks are not predicted by using any of the B-frame blocks, i.e. no motion vector points to blocks in B-frames. In FIG. 27 blocks like D to G are such well-exchangeable blocks. FIG. 28 is showing more details.

A more sophisticated method is to also use such intra-coded blocks in I- and P-frames which are not referenced by any motion vector. See FIG. 30 for more details.

FIG. 28 is based on FIG. 27 and shows the steps from picture (b2) to picture (b3) as described in connection with FIG. 8. As is apparent from FIG. 28a and FIG. 28b, only the blocks D to E in the first B picture and F to H in the second B picture are exchanged by each other. I.e. all I-frame and P-frame blocks are kept unchanged. The block mixing is carried out only within the same picture. Following mixing, the blocks of the B pictures exchanged and the corresponding motion vectors have been moved together with the moved blocks. The related difference blocks have been moved, too.

An MPEG Video decoder would decode such a stream without any problems because it is completely MPEG Video standard conform. However, when decoded and displayed directly, the resulting video would contain terrible blocking artifacts. A playback of a such encoded video would not make any sense without corresponding operation of the CP splitter box. The CP splitter box re-mixes the blocks as shown in FIG. 28c. The CP splitter box does not know anything about MPEG Video encoding/decoding. Therefore the blocks are shifted bitmap blocks as directly received from the video signal output from the playback device (e.g. a DVD player). Finally, the blocks in the FIG. 28a and FIG. 28c picture sequences have their corresponding blocks located at the same position.

Figure 29:
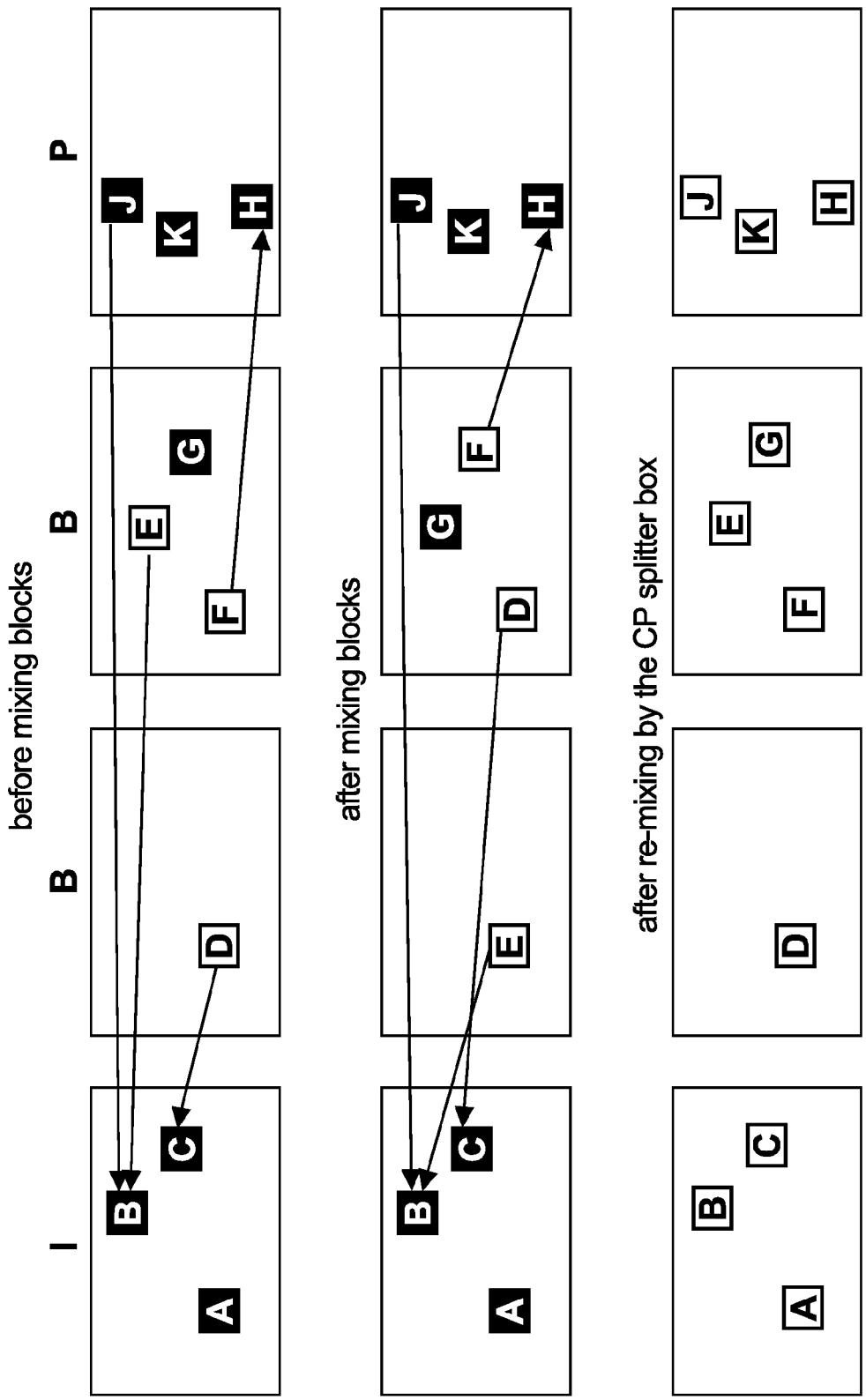

FIG. 29 is similar to FIG. 28. The difference is that blocks are exchanged between different B pictures. This increases the degree of de-scrambling but requires also a larger buffer inside the CP splitter box for storing the pictures appropriately. Additionally, the CP splitter box delays the presentation to the beamers, because it needs the decoded frame for the second B picture to produce the descrambled video picture for the first B picture.

Figure 30:
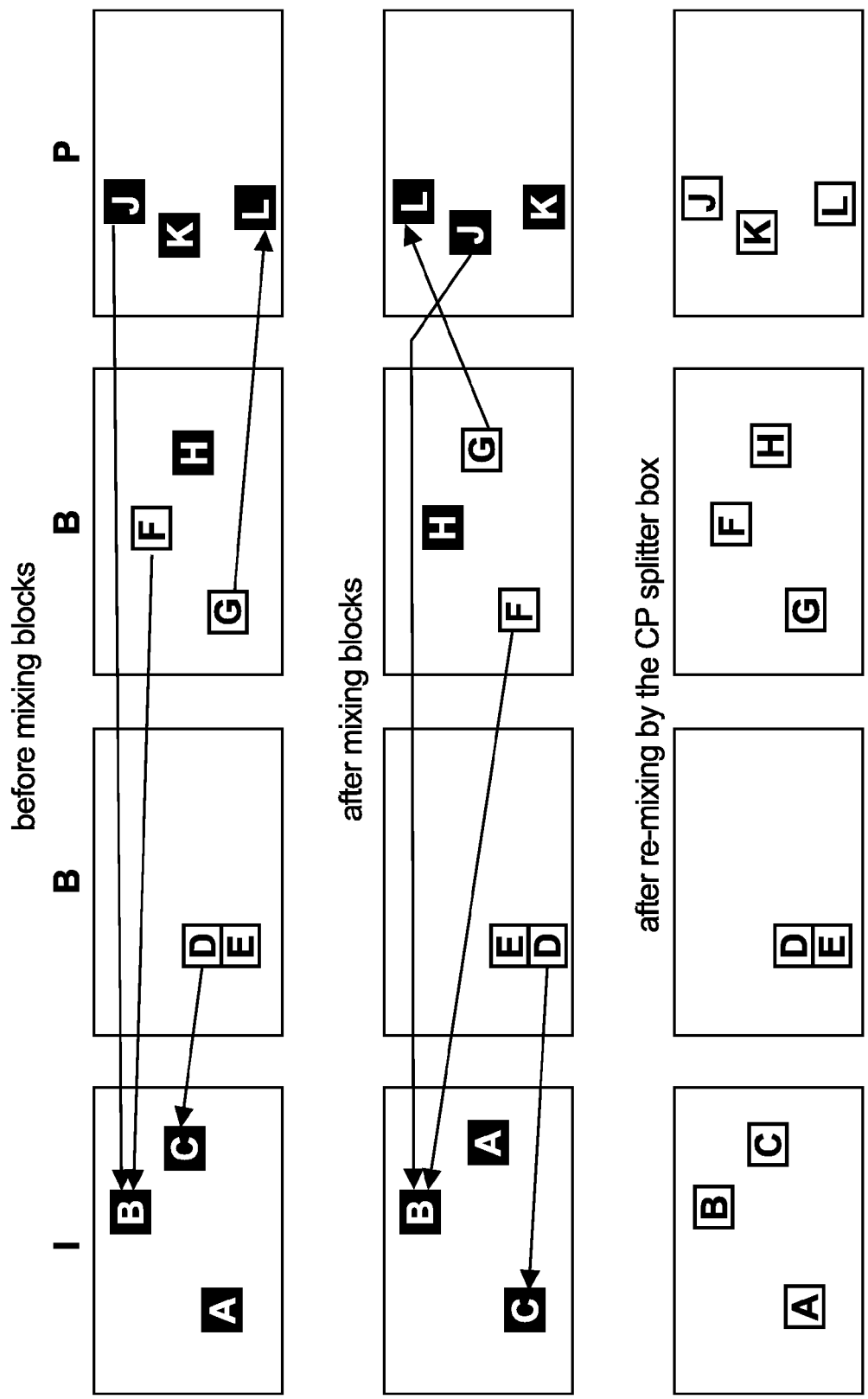

In FIG. 30, also blocks inside the I picture and the P picture are exchanged. This additionally requires that motion vectors must follow these motions. Therefore the mixing process (FIG. 8, from (b2) to (b3)) is more complex because a mixing in I- or B-pictures needs a check in other pictures whether there are motion vectors which have to follow a block exchange.

Figure 31:
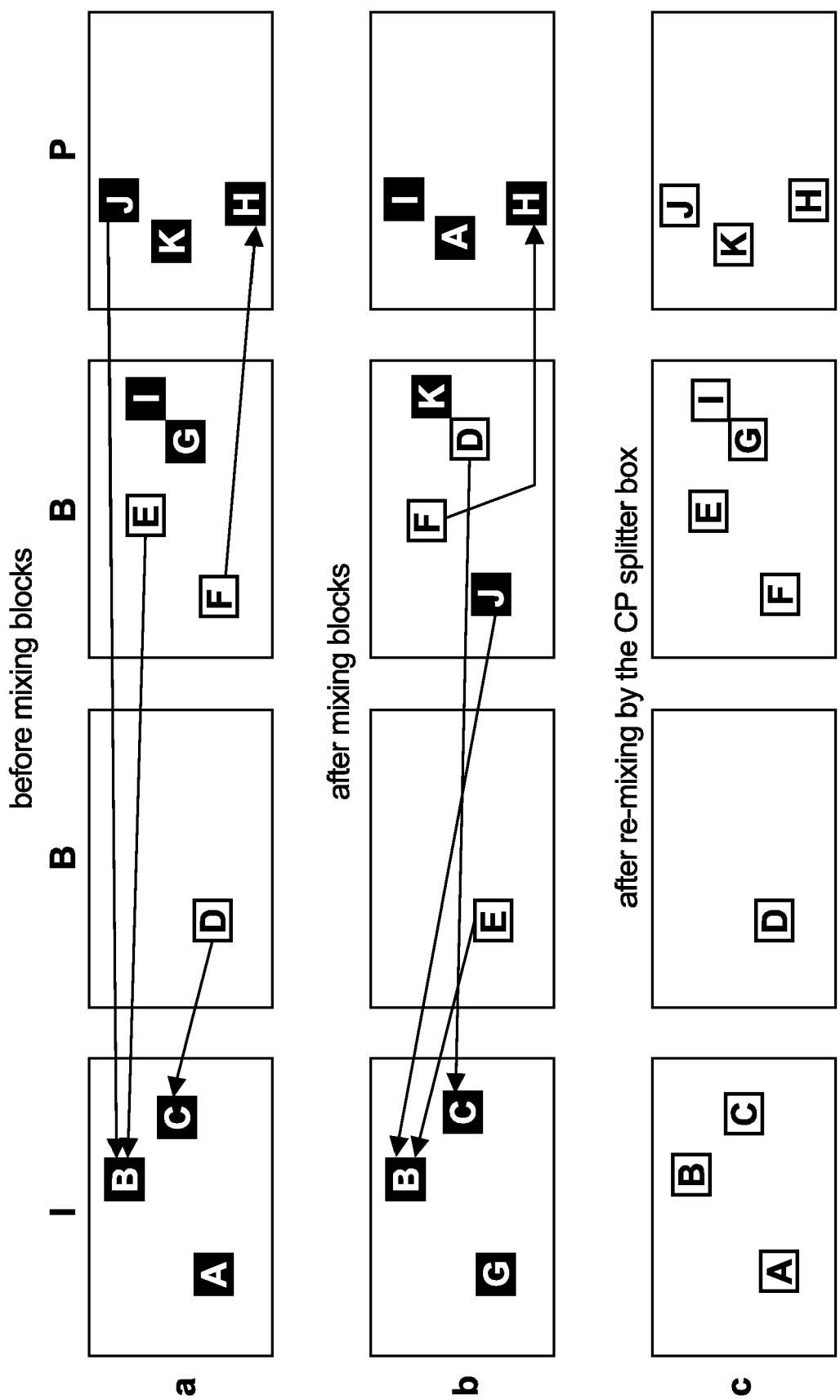

FIG. 31 is similar to FIG. 30. The difference is that blocks between different picture types are exchanged, e.g. B picture blocks are shifted to I or P picture block positions, and vice versa. This again increases the degree of descrambling and requires a larger buffer inside the CP splitter box for storing the pictures appropriately. If intra-blocks are not referenced to by any motion vectors (e.g. block 'K' in FIG. 31a), then they may be exchanged even with B-frames. Additionally, the CP splitter box delays the presentation to the beamers because it needs the decoded picture for the second B picture to produce the descrambled video picture for the first B picture.

Figure 32:
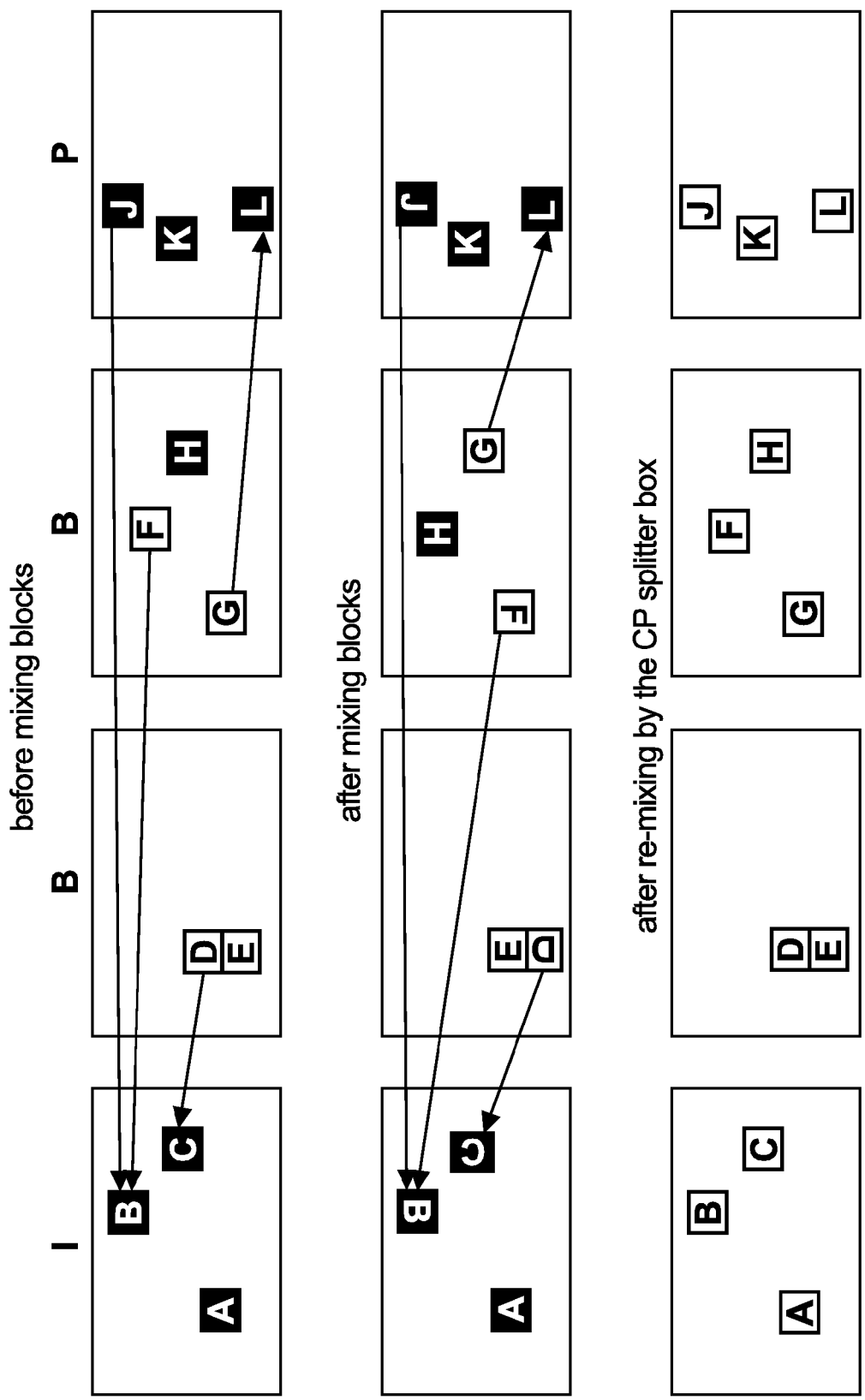

FIG. 32 is similar to FIG. 28. The difference is that the blocks B, F, and J are flipped horizontally and vertically (i.e. they are rotated by 180 degrees) and the blocks C and D are rotated clockwise by 270 degrees. If blocks are flipped or rotated, then all corresponding referenced blocks must become flipped or rotated, respectively, in the identical manner. Thereby the re-encoding of a block (e.g. requiring cosine transformation) can be avoided. Therefore a reordering of the cosine transformed values is sufficient, i.e. it is a loss-less transformation and the resulting picture quality is kept unchanged.

In one embodiment, the required distortion information may be read by the CP splitter box by playback of a special menu on a disc, which disc or storage medium contains special (e.g. teletext) signals which including encrypted distortion information. The CP splitter box recognises the transmission of such data and receives the distortion information. Internally, the CP splitter box will decrypt this information and fills its internal distortion information table with that information. Following this initialisation process, the user may playback the actual video, i.e. the CP splitter box is now able to descramble the incoming video signals in the right manner.

For additional security, the CP splitter box may add a watermark to the projection. The watermark can be used for tracking any camcorder recording of the projected video.

In a further embodiment, the CP splitter box generates from its video input signal three or more different output video signals which are projected by a corresponding number of three or more beamers each having a different position and/or angle, using the corresponding above-described principles or means in a correspondingly adapted manner.

The terms 'beamer' and 'silver screen' mean any kind of representing a picture in which the picture to be looked at is formed by different directional picture signal light sources coming from different directions.

The invention claimed is:

1. Method for generating and displaying video signal data in a manner protected against digital copying, comprising the steps:

providing partitioned video signal data derived from original video signal data;
encoding said partitioned video signal data and providing for said encoded video signal data presentation control information data that are related to said partition;
receiving and correspondingly decoding said encoded video signal data;
splitting the decoded video signal data into data for at least two different video signals according to said partitioning, thereby using said presentation control information data and a distortion of at least one of said partitions according to distortion information data;
supplying each one of said different video signals to a corresponding number of directional light sources for picture signals, each of which light sources has a different position and/or angle with respect to a common screen on which all light sources project their video signals in order to form a merged video signal approximating said original video signal,
wherein said positions and/or angles of said light sources are adapted to said distortion information data.

2. Method according to claim 1, wherein said encoding is an MPEG1 Video or MPEG2 Video or MPEG4-2 Video or MPEG4-10 AVC Video or VC-1 encoding.

3. Method according to claim 2, wherein said partition is made in B pictures only.

4. Method according to claim 1, wherein said presentation control information data is included in audio data packs, or is included in the received video signal data, in particular in a format coded as a tele-text or closed caption signal.

5. Method according to claim 1, wherein said distortion is a perspective distortion and/or a scrambling of macroblocks or blocks or coefficients.

6. Method according to claim 1, wherein in a partition including distorted picture content the picture content is shrank picture content and may be flipped or rotated.

7. Method according to claim 1, wherein said partitioned video signal data were merged before being encoded as a single video signal.

8. Method according to claim 1, wherein said distortion at receiver side is carried out in circuitry that is protected against external access.

9. Method according to claim 8, wherein said presentation control information data include a key for generating said distortion information data within said circuitry, e.g. a memory.

10. Method according to claim 1, wherein said distortion information data are encrypted.

11. Method for providing encoded video signal data that are protected against digital copying, comprising the steps:

providing partitioned video signal data derived from original video signal data;
encoding said partitioned video signal data and providing for said encoded video signal data presentation control information data that are related to said partition,
wherein said presentation control information data serve for, upon receiving and correspondingly decoding said encoded video signal data, a split of the decoded video signal data into data for at least two different video signals according to said partitioning using said presentation control information data and a distortion of at least one of said partitions according to distortion information data,
and serve for, upon supplying each one of said different video signals to a corresponding number of directional light sources for picture signals, each of which light sources having a different position and/or angle with respect to a common screen, projection of the video signals of all light sources on said screen in order to form a merged video signal approximating said original video signal, wherein said positions and/or angles of said light sources are adapted to said distortion information data.

12. Method according to claim 11, wherein said encoding is an MPEG1 Video or MPEG2 Video or MPEG4-2 Video or MPEG4-10 AVC Video or VC-1 encoding.

13. Method according to claim 12, wherein said partition is made in B pictures only.

14. Method according to claim 11, wherein said presentation control information data is included in audio data packs, or is included in the received video signal data, in particular in a format coded as a tele-text or closed caption signal.

15. Method according to claim 11, wherein said distortion is a perspective distortion and/or a scrambling of macroblocks or blocks or coefficients.

16. Method according to claim 11, wherein in a partition including distorted picture content the picture content is shrank picture content and may be flipped or rotated.

17. Method according to claim 11, wherein said partitioned video signal data were merged before being encoded as a single video signal.

18. Method according to claim 11, wherein said distortion at receiver side is carried out in circuitry that is protected against external access.

19. Method according to claim 18, wherein said presentation control information data include a key for generating said distortion information data within said circuitry, e.g. a memory.

20. Method according to claim 11, wherein said distortion information data are encrypted.

21. Method for processing encoded video signal data that are protected against digital copying, wherein at encoder side partitioned video signal data were provided that were derived from original video signal data and said partitioned video signal data were encoded and for said encoded video signal data presentation control information data related to said partition were provided, said method comprising the steps:
receiving and correspondingly decoding said encoded video signal data;
splitting the decoded video signal data into data for at least two different video signals according to said partitioning, thereby using said presentation control information data and a distortion of at least one of said partitions according to distortion information data;
supplying each one of said different video signals to a corresponding number of directional light sources for picture signals, each of which light sources has a different position and/or angle with respect to a common screen on which all light sources project their video signals in order to form a merged video signal approximating said original video signal,
wherein said positions and/or angles of said light sources are adapted to said distortion information data.

22. Method according to claim 21, wherein said encoding is an MPEG1 Video or MPEG2 Video or MPEG4-2 Video or MPEG4-10 AVC Video or VC-1 encoding.

23. Method according to claim 22, wherein said partition is made in B pictures only.

24. Method according to claim 21, wherein said presentation control information data is included in audio data packs, or is included in the received video signal data, in particular in a format coded as a tele-text or closed caption signal.

25. Method according to claim 21, wherein said distortion is a perspective distortion and/or a scrambling of macroblocks or blocks or coefficients.

26. Method according to claim 21, wherein in a partition including distorted picture content the picture content is shrank picture content and may be flipped or rotated.

27. Method according to claim 21, wherein said partitioned video signal data were merged before being encoded as a single video signal.

28. Method according to claim 21, wherein said distortion at receiver side is carried out in circuitry that is protected against external access.

29. Method according to claim 28, wherein said presentation control information data include a key for generating said distortion information data within said circuitry, e.g. a memory.

30. Method according to claim 21, wherein said distortion information data are encrypted.

31. Apparatus for processing encoded video signal data that are protected against digital copying, wherein at encoder side partitioned video signal data were provided that were derived from original video signal data and said partitioned video signal data were encoded and for said encoded video signal data presentation control information data related to said partition were provided, said apparatus comprising:
means being adapted for splitting received and correspondingly decoded video signal data into data for at least two different video signals according to said partitioning, thereby using said presentation control information data and a distortion of at least one of said partitions according to distortion information data,
and for supplying each one of said different video signals to a corresponding number of directional light sources for picture signals, each of which light sources has a different position and/or angle with respect to a common screen on which all light sources project their video signals in order to form a merged video signal approximating said original video signal,
wherein said positions and/or angles of said light sources are adapted to said distortion information data.

32. Apparatus according to claim 31, wherein said encoding is an MPEG1 Video or MPEG2 Video or MPEG4-2 Video or MPEG4-10 AVC Video or VC-1 encoding.

33. Method or apparatus according to claim 5, wherein said partition is made in B pictures only.

34. Apparatus according to claim 31, wherein said presentation control information data is included in audio data packs, or is included in the received video signal data, in particular in a format coded as a tele-text or closed caption signal.

35. Apparatus according to claim 31, wherein said distortion is a perspective distortion and/or a scrambling of macroblocks or blocks or coefficients.

36. Apparatus according to claim 31, wherein in a partition including distorted picture content the picture content is shrank picture content and may be flipped or rotated.

37. Apparatus according to claim 31, wherein said partitioned video signal data were merged before being encoded as a single video signal.

38. Apparatus according to claim 31, wherein said distortion at receiver side is carried out in circuitry that is protected against external access.

39. Apparatus according to claim 38, wherein said presentation control information data include a key for generating said distortion information data within said circuitry, e.g. a memory.

40. Apparatus according to claim 31, wherein said distortion information data are encrypted.

41. A non-transitory storage medium, for example on optical disc, that contains or stores, or has recorded on it, a digital video signal encoded according to the method of claim 1.

42. A digital video/audio bit stream encoded according to the method of claim 1.

43. Method for generating and displaying video signal data in a manner protected against perfect copying, comprising the steps:
 providing partitioned video signal data derived from original video signal data, in which video signal data at least one partition is scrambled;
 encoding said partitioned video signal data and providing for said encoded video signal data presentation control information data that are related to said partition and said scrambling;
 receiving and correspondingly decoding said encoded video signal data;
 descrambling the decoded video signal data thereby using said presentation control information data;
 supplying the resulting video signal to a light source for picture signals.

* * * * *